(12) United States Patent
Belling

(10) Patent No.: US 12,520,109 B2
(45) Date of Patent: Jan. 6, 2026

(54) POLICY CONTROL FOR BROADCAST SESSION

(71) Applicant: NOKIA TECHNOLOGIES OY, Espoo (FI)

(72) Inventor: Thomas Belling, Erding (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 673 days.

(21) Appl. No.: 17/884,765

(22) Filed: Aug. 10, 2022

(65) Prior Publication Data

US 2023/0049862 A1 Feb. 16, 2023

Related U.S. Application Data

(60) Provisional application No. 63/231,534, filed on Aug. 10, 2021.

(51) Int. Cl.
*H04W 4/00* (2018.01)
*H04W 4/06* (2009.01)
*H04W 72/30* (2023.01)

(52) U.S. Cl.
CPC ............. *H04W 4/06* (2013.01); *H04W 72/30* (2023.01)

(58) Field of Classification Search
CPC ..................................................... H04W 4/06
See application file for complete search history.

(56) References Cited

U.S. PATENT DOCUMENTS

| 12,401,568 | B2* | 8/2025 | Hong | H04L 41/0894 |
|---|---|---|---|---|
| 2021/0067958 | A1* | 3/2021 | Lee | H04W 12/106 |
| 2021/0105665 | A1* | 4/2021 | Bennett | H04W 24/04 |
| 2022/0312176 | A1* | 9/2022 | Matolia | H04W 48/16 |
| 2023/0038198 | A1* | 2/2023 | Lewis | H04L 41/5019 |
| 2024/0089801 | A1* | 3/2024 | Chen | H04W 28/24 |
| 2024/0187849 | A1* | 6/2024 | Guo | H04W 12/76 |

FOREIGN PATENT DOCUMENTS

| EP | 4044614 A1 | 8/2022 |
|---|---|---|
| WO | 2021088501 A1 | 5/2021 |

OTHER PUBLICATIONS

Tran et al., Enabling Multicast and Broadcast in the 5G Core for Converged Fixed and Mobile Networks, Jun. 2020, IEEE Transactions on Broadcasting, vol. 66, No. 2, pp. 1-12. (Year: 2020).*

(Continued)

*Primary Examiner* — Elisabeth Benoit Magloire
(74) *Attorney, Agent, or Firm* — SQUIRE PATTON BOGGS (US) LLP

(57) ABSTRACT

Systems, methods, apparatuses, and computer program products for policy control for broadcast sessions. One method may include receiving, by a multicast/broadcast session management function, at least one broadcast session creation request comprising at least one broadcast session indication associated with at least one policy control function. The multicast/broadcast session management function may receive at least one policy update from the at least one policy control function, and transmit at least one resource allocation request associated with at least one broadcast session transmission to at least one application management function.

16 Claims, 10 Drawing Sheets

(56) References Cited

OTHER PUBLICATIONS

3GPP TR 23.757 V17.0.0 (Mar. 2021), 3rd Generation Partnership Project; Technical Specification Group Services and System Aspects; Study on architectural enhancements for 5G multicast-broadcast services (Release 17), 298 pages.
3GPP TS 23.247 V0.3.0 (May 2021), 3rd Generation Partnership Project; Technical Specification Group Services and System Aspects; Architectural enhancements for 5G multicast-broadcast services; Stage 2 (Release 17), 81 pages.
Extended European Search Report dated Jan. 3, 2023, corresponding to European Patent Application No. 22189359.7.
Zte et al: "modification clause 7.3 on the Broadcast session management", 3GPP Draft; S2-2105193, SA WG2, May 31, 2021, XP052018215, Retrieved from the Internet: URL:https://ftp.3gpp.orgitsg_sa/WG2_Arch/TSGS2_145E_Electronic_2021-05/Docs/S2-2105193.zip S2-2105193_was_S2-2104181r03 [5MBS] [7.3] modification on the Braodcast session management.doc [retrieved on May 31, 2021].
"3rd Generation Partnership Project; Technical Specification Group Services and System Aspects; Architectural enhancements for 5G multicast-broadcast services; Stage 2 (Release 17)", 3GPP Draft; SP-210368.ZIP 23247-100, Jun. 7, 2021 (Jun. 7, 2021), XP052026107, TSGs_92E_Electronic_2021_06/Docs/SP-210368.zip23247-100.zip 23247-100.docx [retrieved on Jun. 7, 2021] Retrieved from the Internet: URL:https://ftp.3gpp.orgitsg sa/.

\* cited by examiner

POLICY CONTROL FOR BROADCAST SESSION

CROSS REFERENCE TO RELATED APPLICATION

This application claims the benefit of U.S. Provisional Application No. 63/231,534, filed Aug. 10, 2021. The entire content of the above-referenced application is hereby incorporated by reference.

TECHNICAL FIELD

Some example embodiments may generally relate to mobile or wireless telecommunication systems, such as Long Term Evolution (LTE), fifth generation (5G) radio access technology (RAT), new radio (NR) access technology, and/or other communications systems. For example, certain example embodiments may relate to systems and/or methods for policy controls for broadcast sessions.

BACKGROUND

Examples of mobile or wireless telecommunication systems may include 5G RAT, the Universal Mobile Telecommunications System (UNITS) Terrestrial Radio Access Network (UTRAN), LTE Evolved UTRAN (E-UTRAN), LTE-Advanced (LTE-A), LTE-A Pro, NR access technology, and/or MulteFire Alliance. 5G wireless systems refer to the next generation (NG) of radio systems and network architecture. A 5G system is typically built on a 5G NR, but a 5G (or NG) network may also be built on E-UTRA radio. It is expected that NR can support service categories such as enhanced mobile broadband (eMBB), ultra-reliable low-latency-communication (URLLC), and massive machine-type communication (mMTC). NR is expected to deliver extreme broadband, ultra-robust, low-latency connectivity, and massive networking to support the Internet of Things (IoT). The next generation radio access network (NG-RAN) represents the RAN for 5G, which may provide radio access for NR, LIE, and LTE-A. It is noted that the nodes in 5G providing radio access functionality to a user equipment (e.g., similar to the Node B in UTRAN or the Evolved Node B (eNB) in LTE) may be referred to as next-generation Node B (gNB) when built on NR radio, and may be referred to as next-generation eNB (NG-eNB) when built on E-UTRA radio.

SUMMARY

In accordance with some example embodiments, a method may include receiving, by a multicast/broadcast session management function, at least one multicast/broadcast session creation request comprising at least one indication of policy authorization for the broadcast session. The method may further include requesting, by the multicast/broadcast session management function, in response to the at least one indication of policy authorization for the broadcast session, the creation of a policy control session for the multicast/broadcast session from at least one policy control function.

In accordance with certain example embodiments, an apparatus may include means for receiving at least one multicast/broadcast session creation request comprising at least one indication of policy authorization for the broadcast session. The apparatus may further include means for requesting, in response to the at least one indication of policy authorization for the broadcast session, the creation of a policy control session for the multicast/broadcast session from at least one policy control function.

In accordance with various example embodiments, an apparatus may include at least one processor and at least one memory including computer program code. The at least one memory and the computer program code may be configured to, with the at least one processor, cause the apparatus to at least receive at least one multicast/broadcast session creation request comprising at least one indication of policy authorization for the broadcast session. The at least one memory and the computer program code may be further configured to, with the at least one processor, cause the apparatus to at least request, in response to the at least one indication of policy authorization for the broadcast session, the creation of a policy control session for the multicast/broadcast session from at least one policy control function.

In accordance with some example embodiments, a non-transitory computer readable medium may be encoded with instructions that may, when executed in hardware, perform a method. The method may include receiving at least one multicast/broadcast session creation request comprising at least one indication of policy authorization for the broadcast session. The method may further include requesting, in response to the at least one indication of policy authorization for the broadcast session, the creation of a policy control session for the multicast/broadcast session from at least one policy control function.

In accordance with certain example embodiments, a computer program product may perform a method. The method may include receiving at least one multicast/broadcast session creation request comprising at least one indication of policy authorization for the broadcast session. The method may further include requesting, in response to the at least one indication of policy authorization for the broadcast session, the creation of a policy control session for the multicast/broadcast session from at least one policy control function.

In accordance with various example embodiments, an apparatus may include circuitry configured to receive at least one multicast/broadcast session creation request comprising at least one indication of policy authorization for the broadcast session. The circuitry may further be configured to request, in response to the at least one indication of policy authorization for the broadcast session, the creation of a policy control session for the multicast/broadcast session from at least one policy control function.

In accordance with some example embodiments, a method may include receiving, by a network exposure function or a multicast/broadcast service function, at least one request to create a multicast/broadcast session. The method may further include determining, by the network exposure function or the multicast/broadcast service function, whether to create a policy authorization session for the multicast/broadcast session. The method may further include requesting, by the network exposure function or the multicast/broadcast service function, from at least one multicast/broadcast session management function, a creation of the multicast/broadcast session. In response to determining to create a policy authorization session, the request for creation of the multicast/broadcast session comprises at least one indication of policy authorization. The method may further include requesting, by the network exposure function or the multicast/broadcast service function, in response to the determining to create a policy authorization session, the creation of a policy authorization session for the multicast/broadcast session from at least one policy control function.

In accordance with certain example embodiments, an apparatus may include means for receiving at least one request to create a multicast/broadcast session. The apparatus may further include means for determining whether to create a policy authorization session for the multicast/broadcast session. The apparatus may further include means for requesting, from at least one multicast/broadcast session management function, a creation of the multicast/broadcast session. In response to determining to create a policy authorization session, the request for creation of the multicast/broadcast session comprises at least one indication of policy authorization. The apparatus may further include means for requesting, in response to the determining to create a policy authorization session, the creation of a policy authorization session for the multicast/broadcast session from at least one policy control function.

In accordance with various example embodiments, an apparatus may include at least one processor and at least one memory including computer program code. The at least one memory and the computer program code may be configured to, with the at least one processor, cause the apparatus to at least receive at least one request to create a multicast/broadcast session. The at least one memory and the computer program code may be further configured to, with the at least one processor, cause the apparatus to at least determine whether to create a policy authorization session for the multicast/broadcast session. The at least one memory and the computer program code may be further configured to, with the at least one processor, cause the apparatus to at least requesting, from at least one multicast/broadcast session management function, a creation of the multicast/broadcast session. In response to determining to create a policy authorization session, the request for creation of the multicast/broadcast session comprises at least one indication of policy authorization. The at least one memory and the computer program code may be further configured to, with the at least one processor, cause the apparatus to at least requesting, in response to the determining to create a policy authorization session, the creation of a policy authorization session for the multicast/broadcast session from at least one policy control function.

In accordance with some example embodiments, a non-transitory computer readable medium may be encoded with instructions that may, when executed in hardware, perform a method. The method may include receiving at least one request to create a multicast/broadcast session. The method may further include determining whether to create a policy authorization session for the multicast/broadcast session. The method may further include requesting, from at least one multicast/broadcast session management function, a creation of the multicast/broadcast session. In response to determining to create a policy authorization session, the request for creation of the multicast/broadcast session comprises at least one indication of policy authorization. The method may further include requesting, in response to the determining to create a policy authorization session, the creation of a policy authorization session for the multicast/broadcast session from at least one policy control function.

In accordance with certain example embodiments, a computer program product may perform a method. The method may include receiving at least one request to create a multicast/broadcast session. The method may further include determining whether to create a policy authorization session for the multicast/broadcast session. The method may further include requesting, from at least one multicast/broadcast session management function, a creation of the multicast/broadcast session. In response to determining to create a policy authorization session, the request for creation of the multicast/broadcast session comprises at least one indication of policy authorization. The method may further include requesting, in response to the determining to create a policy authorization session, the creation of a policy authorization session for the multicast/broadcast session from at least one policy control function.

In accordance with various example embodiments, an apparatus may include circuitry configured to receive at least one request to create a multicast/broadcast session. The circuitry may further be configured to determine whether to create a policy authorization session for the multicast/broadcast session. The circuitry may further be configured to request, from at least one multicast/broadcast session management function, a creation of the multicast/broadcast session. In response to determining to create a policy authorization session, the request for creation of the multicast/broadcast session comprises at least one indication of policy authorization. The circuitry may further be configured to request, in response to the determining to create a policy authorization session, the creation of a policy authorization session for the multicast/broadcast session from at least one policy control function.

In accordance with some example embodiments, a method may include receiving, by a policy control function, from a multicast/broadcast session management function at least one request for creation of a policy control session for a broadcast session. The method may further include providing, by the policy control function, in response to the at least one request for creation of a policy control session, policy information comprising at least one indication requesting no resource allocation. The method may further include starting, by the policy control function, in response to the request for creation of a policy control session, at least one timer. The method may further include, upon one or more of the at least one timer expiring or receiving at least one request for policy authorization associated to the at least one broadcast session, transmitting, by the policy control function, towards the multicast/broadcast session management function at least one request to update the policies for the policy control session comprising at least one indication requesting resource allocation.

In accordance with certain example embodiments, an apparatus may include means for receiving, from a multicast/broadcast session management function at least one request for creation of a policy control session for a broadcast session. The apparatus may further include means for providing, in response to the at least one request for creation of a policy control session, policy information comprising at least one indication requesting no resource allocation. The apparatus may further include means for starting, in response to the request for creation of a policy control session, at least one timer. The apparatus may further include means for, upon one or more of the at least one timer expiring or receiving at least one request for policy authorization associated to the at least one broadcast session, transmitting towards the multicast/broadcast session management function at least one request to update the policies for the policy control session comprising at least one indication requesting resource allocation.

In accordance with various example embodiments, an apparatus may include at least one processor and at least one memory including computer program code. The at least one memory and the computer program code may be configured to, with the at least one processor, cause the apparatus to at least receive, from a multicast/broadcast session management function at least one request for creation of a policy control session for a broadcast session. The at least one memory and the computer program code may be further configured to, with the at least one processor, cause the apparatus to at least provide, in response to the at least one request for creation of a policy control session, policy information comprising at least one indication requesting no resource allocation. The at least one memory and the computer program code may be further configured to, with the at least one processor, cause the apparatus to at least start, in response to the request for creation of a policy control session, at least one timer. The at least one memory and the computer program code may be further configured to, with the at least one processor, cause the apparatus to at least, upon one or more of the at least one timer expiring or receiving at least one request for policy authorization associated to the at least one broadcast session, transmit towards the multicast/broadcast session management function at least one request to update the policies for the policy control session comprising at least one indication requesting resource allocation.

In accordance with some example embodiments, a non-transitory computer readable medium may be encoded with instructions that may, when executed in hardware, perform a method. The method may include receiving, from a multicast/broadcast session management function at least one request for creation of a policy control session for a broadcast session. The method may further include providing, in response to the at least one request for creation of a policy control session, policy information comprising at least one indication requesting no resource allocation. The method may further include starting, in response to the request for creation of a policy control session, at least one timer. The method may further include, upon one or more of the at least one timer expiring or receiving at least one request for policy authorization associated to the at least one broadcast session, transmitting, towards the multicast/broadcast session management function at least one request to update the policies for the policy control session comprising at least one indication requesting resource allocation.

In accordance with certain example embodiments, a computer program product may perform a method. The method may include receiving, from a multicast/broadcast session management function at least one request for creation of a policy control session for a broadcast session. The method may further include providing, in response to the at least one request for creation of a policy control session, policy information comprising at least one indication requesting no resource allocation. The method may further include starting, in response to the request for creation of a policy control session, at least one timer. The method may further include, upon one or more of the at least one timer expiring or receiving at least one request for policy authorization associated to the at least one broadcast session, transmitting, towards the multicast/broadcast session management function at least one request to update the policies for the policy control session comprising at least one indication requesting resource allocation.

In accordance with various example embodiments, an apparatus may include circuitry configured to receive, from a multicast/broadcast session management function at least one request for creation of a policy control session for a broadcast session. The circuitry may further be configured to provide, in response to the at least one request for creation of a policy control session, policy information comprising at least one indication requesting no resource allocation. The circuitry may further be configured to start, in response to the request for creation of a policy control session, at least one timer. The circuitry may further be configured to, upon one or more of the at least one timer expiring or receiving at least one request for policy authorization associated to the at least one broadcast session, transmit, towards the multicast/broadcast session management function, at least one request to update the policies for the policy control session comprising at least one indication requesting resource allocation.

In accordance with some example embodiments, a method may include receiving, by a multicast/broadcast session management function, at least one broadcast session creation request. The method may further include requesting, by the multicast/broadcast session management function, the creation of a policy control session for the broadcast session from at least one policy control function. The method may further include receiving, by the multicast/broadcast session management function, from the at least one policy control function, in response to the at least one request for creation of a policy control session, policy information comprising at least one indication requesting no resource allocation. The method may further include deferring, by the multicast/broadcast session management function, in response to the at least one indication requesting no resource allocation, at least one resource allocation request associated with the at least one broadcast session to at least one Access and Mobility Management Function until the reception of an update request in the a policy control session. The method may further include receiving, by the multicast/broadcast session management function, at least one policy update request in the policy control session from the at least one policy control function comprising at least one indication requesting resource allocation. The method may further include transmitting, by the multicast/broadcast session management function, in response to the at least one indication requesting resource allocation, at least one resource allocation request associated with at least one broadcast session to at least one Access and Mobility Management Function.

In accordance with certain example embodiments, an apparatus may include means for receiving at least one broadcast session creation request. The apparatus may further include means for requesting the creation of a policy control session for the broadcast session from at least one policy control function. The apparatus may further include means for receiving from the at least one policy control function, in response to the at least one request for creation of a policy control session, policy information comprising at least one indication requesting no resource allocation. The apparatus may further include means for deferring, in response to the at least one indication requesting no resource allocation, at least one resource allocation request associated with the at least one broadcast session to at least one Access and Mobility Management Function until the reception of an update request in the a policy control session. The apparatus may further include means for receiving at least one policy update request in the policy control session from the at least one policy control function comprising at least one indication requesting resource allocation. The apparatus may further include means for transmitting, in response to the at least one indication requesting resource allocation, at least one resource allocation request associated with at least one broadcast session to at least one Access and Mobility Management Function.

In accordance with various example embodiments, an apparatus may include at least one processor and at least one memory including computer program code. The at least one memory and the computer program code may be configured to, with the at least one processor, cause the apparatus to at least receive at least one broadcast session creation request. The at least one memory and the computer program code may be further configured to, with the at least one processor, cause the apparatus to at least request the creation of a policy control session for the broadcast session from at least one policy control function. The at least one memory and the computer program code may be further configured to, with the at least one processor, cause the apparatus to at least receive, from the at least one policy control function, in response to the at least one request for creation of a policy control session, policy information comprising at least one indication requesting no resource allocation. The at least one memory and the computer program code may be further configured to, with the at least one processor, cause the apparatus to at least defer, in response to the at least one indication requesting no resource allocation, at least one resource allocation request associated with the at least one broadcast session to at least one Access and Mobility Management Function until the reception of an update request in the a policy control session. The at least one memory and the computer program code may be further configured to, with the at least one processor, cause the apparatus to at least receive, at least one policy update request in the policy control session from the at least one policy control function comprising at least one indication requesting resource allocation. The at least one memory and the computer program code may be further configured to, with the at least one processor, cause the apparatus to at least transmit, in response to the at least one indication requesting resource allocation, at least one resource allocation request associated with at least one broadcast session to at least one Access and Mobility Management Function.

In accordance with some example embodiments, a non-transitory computer readable medium may be encoded with instructions that may, when executed in hardware, perform a method. The method may include receiving, at least one broadcast session creation request. The method may further include requesting the creation of a policy control session for the broadcast session from at least one policy control function. The method may further include receiving, from the at least one policy control function, in response to the at least one request for creation of a policy control session, policy information comprising at least one indication requesting no resource allocation. The method may further include deferring, in response to the at least one indication requesting no resource allocation, at least one resource allocation request associated with the at least one broadcast session to at least one Access and Mobility Management Function until the reception of an update request in the a policy control session. The method may further include receiving at least one policy update request in the policy control session from the at least one policy control function comprising at least one indication requesting resource allocation. The method may further include transmitting, in response to the at least one indication requesting resource allocation, at least one resource allocation request associated with at least one broadcast session to at least one Access and Mobility Management Function.

In accordance with certain example embodiments, a computer program product may perform a method. The method may include receiving, at least one broadcast session creation request. The method may further include requesting the creation of a policy control session for the broadcast session from at least one policy control function. The method may further include receiving, from the at least one policy control function, in response to the at least one request for creation of a policy control session, policy information comprising at least one indication requesting no resource allocation. The method may further include deferring, in response to the at least one indication requesting no resource allocation, at least one resource allocation request associated with the at least one broadcast session to at least one Access and Mobility Management Function until the reception of an update request in the a policy control session. The method may further include receiving at least one policy update request in the policy control session from the at least one policy control function comprising at least one indication requesting resource allocation. The method may further include transmitting, in response to the at least one indication requesting resource allocation, at least one resource allocation request associated with at least one broadcast session to at least one Access and Mobility Management Function.

In accordance with various example embodiments, an apparatus may include circuitry configured to receive at least one broadcast session creation request. The circuitry may further be configured to request the creation of a policy control session for the broadcast session from at least one policy control function. The circuitry may further be configured to receive, from the at least one policy control function, in response to the at least one request for creation of a policy control session, policy information comprising at least one indication requesting no resource allocation. The circuitry may further be configured to defer, in response to the at least one indication requesting no resource allocation, at least one resource allocation request associated with the at least one broadcast session to at least one Access and Mobility Management Function until the reception of an update request in the a policy control session. The circuitry may further be configured to receive at least one policy update request in the policy control session from the at least one policy control function comprising at least one indication requesting resource allocation. The circuitry may further be configured to transmit, in response to the at least one indication requesting resource allocation, at least one resource allocation request associated with at least one broadcast session to at least one Access and Mobility Management Function.

In accordance with some example embodiments, a method may include receiving, by a multicast/broadcast session management function, at least one broadcast session creation request. The method may further include requesting, by the multicast/broadcast session management function, the creation of a policy control session for the broadcast session from at least one policy control function. The method may further include starting, by the multicast/broadcast session management function, in response to the broadcast session creation request at least one timer associated with at least one broadcast session. The method may further include upon one or more of the at least one timer expiring or receiving at least one policy update request in the policy control session from the at least one policy control function, transmitting, by the multicast/broadcast session management function, to at least one access and mobility management function, at least one resource allocation request associated with the at least one broadcast session.

In accordance with certain example embodiments, an apparatus may include means for receiving at least one broadcast session creation request. The apparatus may further include means for requesting the creation of a policy control session for the broadcast session from at least one policy control function. The apparatus may further include means for starting, in response to the broadcast session creation request at least one timer associated with at least one broadcast session. The apparatus may further include means for upon one or more of the at least one timer expiring or receiving at least one policy update request in the policy control session from the at least one policy control function, transmitting, to at least one access and mobility management function, at least one resource allocation request associated with the at least one broadcast session.

In accordance with various example embodiments, an apparatus may include at least one processor and at least one memory including computer program code. The at least one memory and the computer program code may be configured to, with the at least one processor, cause the apparatus to at least receive at least one broadcast session creation request. The at least one memory and the computer program code may be further configured to, with the at least one processor, cause the apparatus to at least request the creation of a policy control session for the broadcast session from at least one policy control function. The at least one memory and the computer program code may be further configured to, with the at least one processor, cause the apparatus to at least start, in response to the broadcast session creation request at least one timer associated with at least one broadcast session. The at least one memory and the computer program code may be further configured to, with the at least one processor, cause the apparatus to at least upon one or more of the at least one timer expiring or receiving at least one policy update request in the policy control session from the at least one policy control function, transmit, to at least one access and mobility management function, at least one resource allocation request associated with the at least one broadcast session.

In accordance with some example embodiments, a non-transitory computer readable medium may be encoded with instructions that may, when executed in hardware, perform a method. The method may include receiving at least one broadcast session creation request. The method may further include requesting the creation of a policy control session for the broadcast session from at least one policy control function. The method may further include starting, in response to the broadcast session creation request at least one timer associated with at least one broadcast session. The method may further include upon one or more of the at least one timer expiring or receiving at least one policy update request in the policy control session from the at least one policy control function, transmitting, to at least one access and mobility management function, at least one resource allocation request associated with the at least one broadcast session.

In accordance with certain example embodiments, a computer program product may perform a method. The method may include receiving at least one broadcast session creation request. The method may further include requesting the creation of a policy control session for the broadcast session from at least one policy control function. The method may further include starting, in response to the broadcast session creation request at least one timer associated with at least one broadcast session. The method may further include upon one or more of the at least one timer expiring or receiving at least one policy update request in the policy control session from the at least one policy control function, transmitting, to at least one access and mobility management function, at least one resource allocation request associated with the at least one broadcast session.

In accordance with various example embodiments, an apparatus may include circuitry configured to receive at least one broadcast session creation request. The circuitry may further be configured to request the creation of a policy control session for the broadcast session from at least one policy control function. The circuitry may further be configured to start, in response to the broadcast session creation request at least one timer associated with at least one broadcast session. The circuitry may further be configured to upon one or more of the at least one timer expiring or receiving at least one policy update request in the policy control session from the at least one policy control function, transmit, to at least one access and mobility management function, at least one resource allocation request associated with the at least one broadcast session.

BRIEF DESCRIPTION OF THE DRAWINGS

For proper understanding of example embodiments, reference should be made to the accompanying drawings, wherein.

DETAILED DESCRIPTION

Figure 1:
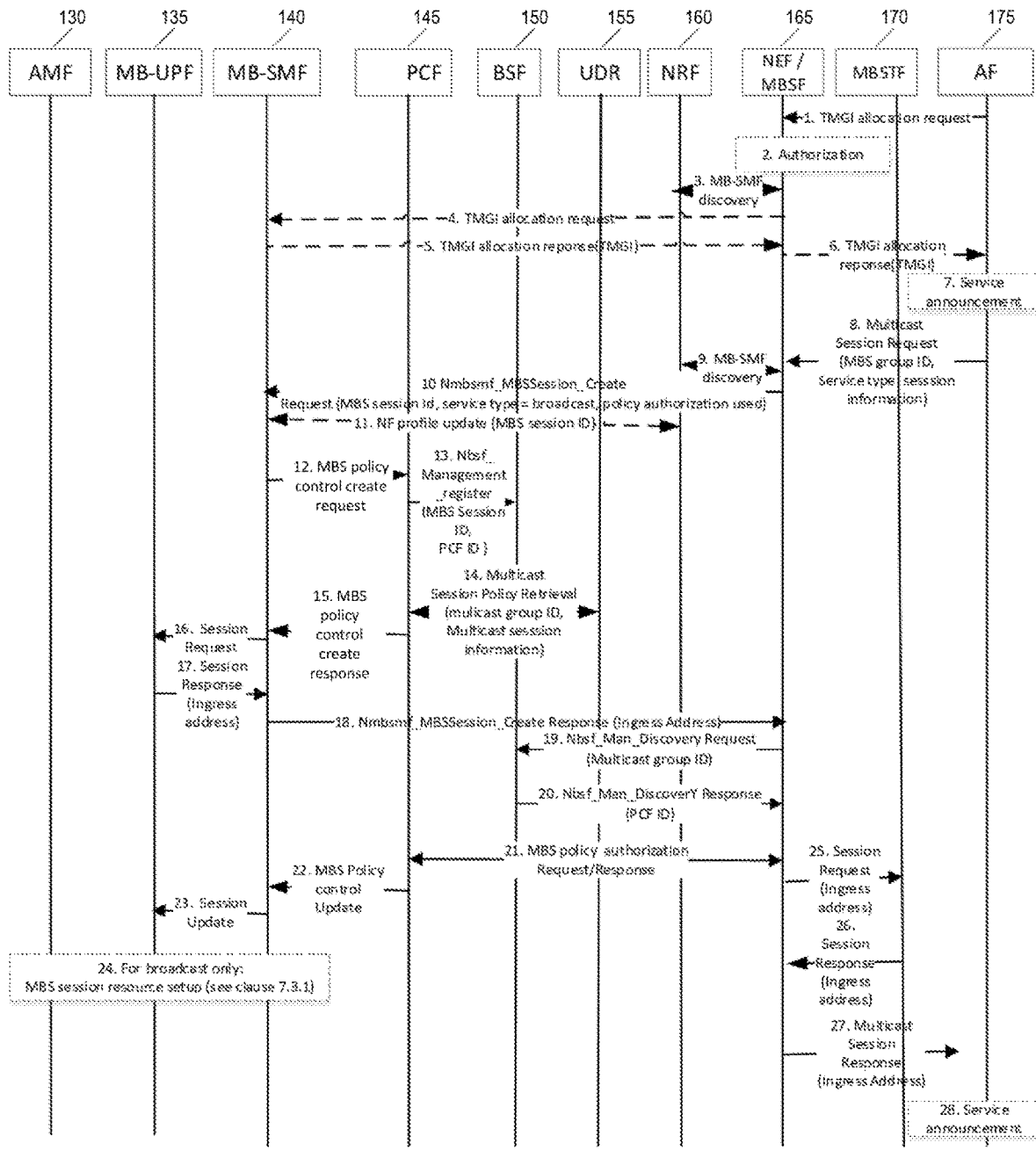
FIG. 1 illustrates an example of a signaling diagram.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for policy controls for broadcast sessions is not intended to limit the scope of certain example embodiments, but is instead representative of selected example embodiments.

Policy updates may occur during certain procedures, and may trigger a potentially large amount of signalling to many access and mobility management function (AMF) and radio access network (RAN) nodes involved in the distribution of a broadcast session. However, a multicast/broadcast session management function (MB-SMF) may not know in advance whether a policy update will occur.

Certain example embodiments described herein may have various benefits and/or advantages to overcome the disadvantages described above. For example, certain example embodiments may enable an MB-SMF to know if a policy update will occur in advance. Certain embodiments may also avoid duplicated signalling for the establishment of broadcast resources towards RAN nodes due to possible policy updates within the initial configuration procedures.

Thus, certain example embodiments discussed below are directed to improvements in computer-related technology.

In some example embodiments, in the request to create a broadcast session, a network exposure function (NEF) or multicast/broadcast service function (MBSF) may indicate to a MB-SMF whether it will also provide a policy authorization for the broadcast session with the policy control function (PCF). If the MB-SMF obtains this indication, it waits until after requesting and obtaining policies for the broadcast session from the PCF for an update of policies from the PCF before signaling to AMFs to request the allocation of resources to for the transmission of the broadcast session. When obtaining a request for the creation of a policy authorization for a broadcast session, for which it already performs policy control towards an MB-SMF, the PCF may provide a policy update message to the MB-SMF even if no policies need to be changed. In certain example embodiments, the PCF may repeat previous policies or send an empty update message.

In certain example embodiments, policies for broadcast sessions provided by the PCF to the MB-SMF may contain an indication whether resources to for the transmission of the broadcast session shall be allocated. When obtaining a request to establish policy control for a broadcast session from the MB-SMF, the PCF may decide to provide policies requesting no resource allocation in the reply and start a timer to wait for the establishment of a policy authorization. Upon expiry of that timer or upon receiving a request for a policy authorization for that broadcast session from the NEF or MBSF, the PCF provides policies requesting the resource allocation. Based on the indication about the resource allocation in the policies, the MB-SMF signals to AMFs to request the allocation of resources to for the transmission of the broadcast session.

In various example embodiments, after receiving a request to create a broadcast session, and requesting and obtaining policies for the broadcast session from the PCF, the MB-SMF may start a timer to wait for an update of those policies from the PCF. Upon expiry of that timer or upon receiving updated policies from the PCF, the MB-SMF may signal to AMFs to request the allocation of resources to for the transmission of the broadcast session.

Figure 9:
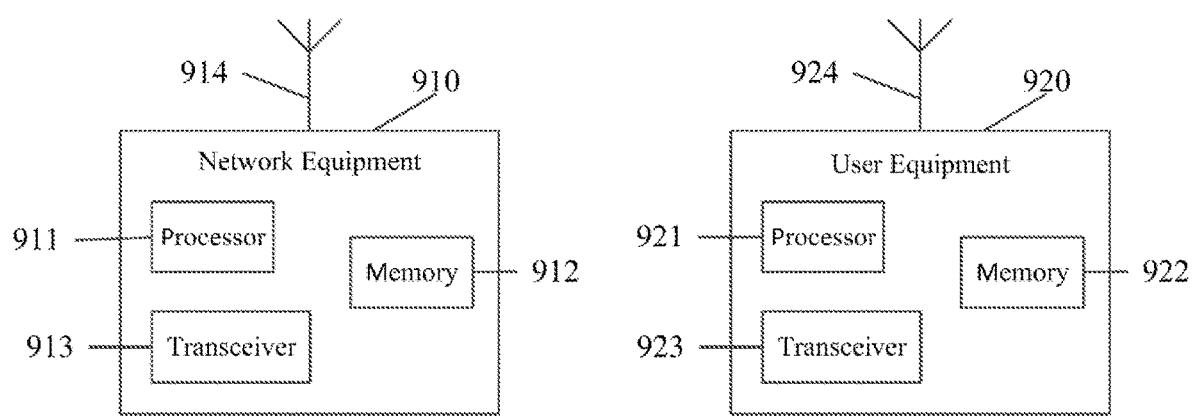
FIG. 9 illustrates an example of various network devices, according to some example embodiments.

FIG. 1 illustrates an example of a signaling diagram depicting how to perform initial multicast/broadcast service (MBS) session configuration with policy and charging control (PCC). AMF 130, multicast/broadcast user plane function (MB-UPF) 135, MB-SMF 140, PCF 145, binding support function (BSF) 150, unified data repository (UDR) 155, NRF 160, NEF/MBSF 165, multicast/broadcast service transport function (MBSTF) 170, and application function (AF) 175 may be similar to NE 910, as illustrated in FIG. 9, according to certain example embodiments.

AF 175 may use the configuration steps for an MBS session to start an MBS session towards 5GC, which may consist of temporary mobile group identity (TMGI) allocation and MBS session start procedures that apply to both multicast and broadcast communications. MBS session establishment/activation procedures may follow MBS session configuration procedures per their service type (multicast or broadcast service) to reserve resources towards NG-RAN. For broadcast communication, MBS session establishment/start may include radio resource reservation towards a NG-RAN. For multicast communication, the radio resource reservation may be performed when a user equipment (UE) is available to join. For both broadcast and multicast communication, the TMGI allocation may be separated from the MBS session establishment/start procedure. For multicast communication, TMGI allocation procedures may be applicable if TMGI is used as MBS Session ID.

At 1, AF 175 may transmit to NEF/MBSF 165 at least one Allocate TMGI Request ( ) message configured to request allocation of a TMGI to identify a new MBS session. Depending on the configuration, MB-SMF 140 may receive requests from AF 175 directly, or via NEF/MBSF 165. At 2, NEF/MBSF 165 may check authorization of AF 175. At 3, NEF/MBSF 165 may discover and select MB-SMF 140 using NRF 160 and/or based on local configurations. At 4, NEF/MBSF 165 may send an Allocate TMGI Request Q message to MB-SMF 140. At 5, MB-SMF 140 may allocate TMGI(s) and return the TMGI(s) to NEF/MBSF 165 via Allocate TMGI Response (TMGI(s)). It is noted that steps 1-5 may be optional, and may only apply if TMGI is used as an MBS Session ID and required to be pre-allocated.

At 6, NEF/MBSF 165 may respond to AF 175 by sending an Allocate TMGI Response (TMGI(s)) message. At 7, AF 175 may perform a service announcement towards at least one UE, which may be similar to UE 920 shown in FIG. 9. For example, AF 175 may inform UEs about MBS Session information with MBS Session ID, e.g., TMGI, source specific multicast address, and possibly other information e.g., MBS service area, session description information, etc. In some example embodiments, the MBS service area information may be a Cell ID list, TAI list, geographical area information, or civic address information. Amongst them, the Cell ID list and TAI list may be used by AFs that reside in trust domain, and when the AFs are aware of such information. In addition, the UEs may need to be aware if the service is broadcast or multicast to decide if to join.

At 8, AF 175 of at least one content provider may provide at least one description for an MBS session (possibly providing information for a previously allocated TMGI; e.g., service type of either multicast service or broadcast service) to NEF/MBSF 165 by MBS Session Request ([MBS Session ID], service type, MBS information,) message. If steps 1-4 have not been executed before, AF 175 may provide a source specific multicast address and/or may request that the network allocate an identifier for the MBS session (i.e., TMGI) and its service type of either multicast service or broadcast service. MBS information may further include QoS requirements, MBS service area information (e.g., step 6) identifying the service scope, start and end time of MBS. In addition, MBS information may also indicate whether the allocation of an ingress transport address is requested. If geographical area information or civic address information was provided by AF 175 as MBS service area, NEF/MBSF 165 may translate the MBS service area to Cell ID list or TAI list. Additionally or alternatively, NEF/MBSF 165 may check for authorizations of at least one content provider.

At 9, NEF/MBSF 165 may discover MB-SMF 140 candidates and/or select MB-SMF 140 as an ingress control node, possibly based on location area. If TMGI is included at step 8, NEF/MBSF 165 may find MB-SMF 140 based on TMGI.

At 10, NEF/MBSF 165 may send an MBS Session Create Request (MBS Session ID, service type, TMGI allocation indication, MBS service area information, ingress transport address request indication) to MB-SMF 140 to request MB-SMF 140 to reserve ingress resources for an MBS distribution session, and may provide MBS Session ID or request allocation, and indicate its service type (either multicast service or broadcast service). In some example embodiments, NEF/MBSF 165 may decide based on local configuration or based on parameters received at 8 (e.g., whether the session comprises several data flows) whether it will invoke the Npcf_MBSPolicy Authorization service for the MBS session. In the request to create a broadcast session, NEF/MBSF 165 may indicate to MB-SMF 135 whether it will also provide a policy authorization session for the MBS session with PCF 145. The MBS Session Create Request may also indicate if the allocation of an ingress transport address is requested. The MBS service area information may be provided by NEF/MBSF 165 to MB-SMF 140 if provided by AF 175 at step 7.

At 11, if MB-SMF 140 is selected by NEF/MBSF 165 at step 9, and source specific multicast address is provided at step 10, MB-SMF 140 may allocate TMGI, and MB-SMF 140 may update at least one NF profile to NRF 160 with the serving MBS Session ID.

In certain example embodiments, if TMGI is used to represent an MBS Session, MB-SMF 140 may not need to update NRF 160 if the TMGI range(s) supported by MB-SMF 140 are already included in the MB-SMF profile when MB-SMF 140 registers itself into NRF 160.

At 12, if NEF/MBSF 165 indicated at 10 that it will also provide a policy authorization for the broadcast session to PCF 145, MB-SMF 140 may select a PCF and send an Npcf_MBSPolicyControl_Create Request (MBS session ID) for the MBS session towards PCF 145 to create a policy control session for the MBS session, and may defer step 24 until MB-SMF 140 receives an Npcf_MBSPolicyControl_UpdateNotify for the MBS session. Otherwise, MB-SMF 140 may decide based on local configuration whether to invoke the Npcf_MBSPolicyControl service.

At 13, PCF 145 may register at BSF 150 that it handles the multicast session. For example, PCF 145 may provide an identifier that the policy authorization is for multicast and the MBS Session ID, its own PCF ID, and optionally its PCF set ID. At 14, PCF 145 may retrieve preconfigured policy information for the MBS session from UDR 155. At 15, PCF 145 may respond in the policy control session with an SM MBS Policy authorization Response (MBS Policy) with policies for the MBS Session ID. Based on the indication in step 10, MB-SMF 140 may not signal to AMFs to request the allocation of resources to for the transmission of the broadcast session after this step.

At 16, if PCC is not used, MB-SMF 140 may derive the required QoS parameters locally. MB-SMF 140 may select MB-UPF 135 and/or request it to reserve user plane ingress resources. If multicast transport of the MBS data towards RAN nodes is to be used, MB-SMF 140 may also request MB-UPF 135 to reserve for the outgoing data a tunnel endpoint and the related identifiers (source IP address, source specific multicast address and GTP Tunnel ID) and to forward data received at the user plane ingress resource using that tunnel endpoint. If ingress address is not requested, MB-SMF 140 may configure MB-UPF 135 to handle the multicast data distribution, and request MB-UPF 135 to join the multicast tree towards the content provider. MB-UPF 135 may also join the distribution tree of the content provider in the subsequent session establishment procedure.

At 17, if requested, MB-UPF 135 may select an ingress address (IP address and port) and a tunnel endpoint for the outgoing data, and provide it to MB-SMF 140. For broadcast communication, MB-SMF 140 may continue the procedure towards AMF 130 (and/or an NG-RAN) before step 17 is executed.

At 18, MB-SMF 140 may indicate the possibly allocated ingress address to NEF/MBSF 165. MB-SMF 140 may include TMGI if it is allocated in step 9. It also indicates the success or failure of reserving transmission resources.

At 19 and 20, NEF/MBSF 165 may use the BSF discovery service, with a request and response, to discover PCF 145 serving the MBS session with the MBS session ID.

At 21, NEF/MBSF may send SM MBS Policy authorization Request to PCF 145 with the MBS session ID and MBS information. PCF 145 may determine whether the request is authorized. If the request is authorized, PCF may derive the required QoS parameters based on the information provided by NEF 165, and determine whether this QoS is allowed (according to the PCF configuration for this application). If the request is not authorized or the required QoS is not allowed, PCF 145 may indicate so in the response to NEF/MBSF 165.

At 22, when obtaining a request for the creation of a policy authorization session at 21, for a broadcast session for which it already performs policy control towards MB-SMF 140, PCF 145 may provide a policy update message to MB-SMF 140 even if no policies need to be changed.

At 23, if required by the updated policies, MB-SMF 140 may update MB-UPF 135, accordingly. At 24, when obtaining an MBS policy control update from PCF 145 at 22, MB-SMF 140 may signal to AMF 130 to request the allocation of resources for the transmission of the broadcast session.

At 25, if NEF/MBSF 165 decides to use MBSTF 170, NEF/MBSF 165 may provide the received ingress address in step 18 towards MBSTF 170 as DL destination, and may request MBSTF 170 to allocate the user plane ingress resources. At 26, if requested, MBSTF 170 may select an ingress address (IP address and port), and provide it to NEF/MBSF 170. At 27, NEF/MBSF-C 165 may include the ingress address if allocated and other parameters (e.g., TMGI) to AF 175 by MBS Session Response ([TMGI], [Allocated ingress address]) message. If MBS Session ID is not provided in step 8, or the MBS Session ID is source specific multicast address, NEF/MBSF 165 may provide the allocated TMGI. If AF 175 requests the allocation of an ingress transport address, the message may also include the allocated ingress address. 28 may be similar to 6, where AF 175 may perform a service announcement. For multicast communication, depending on configuration, at least one UE join request may be accepted from this point onward.

Figure 2:
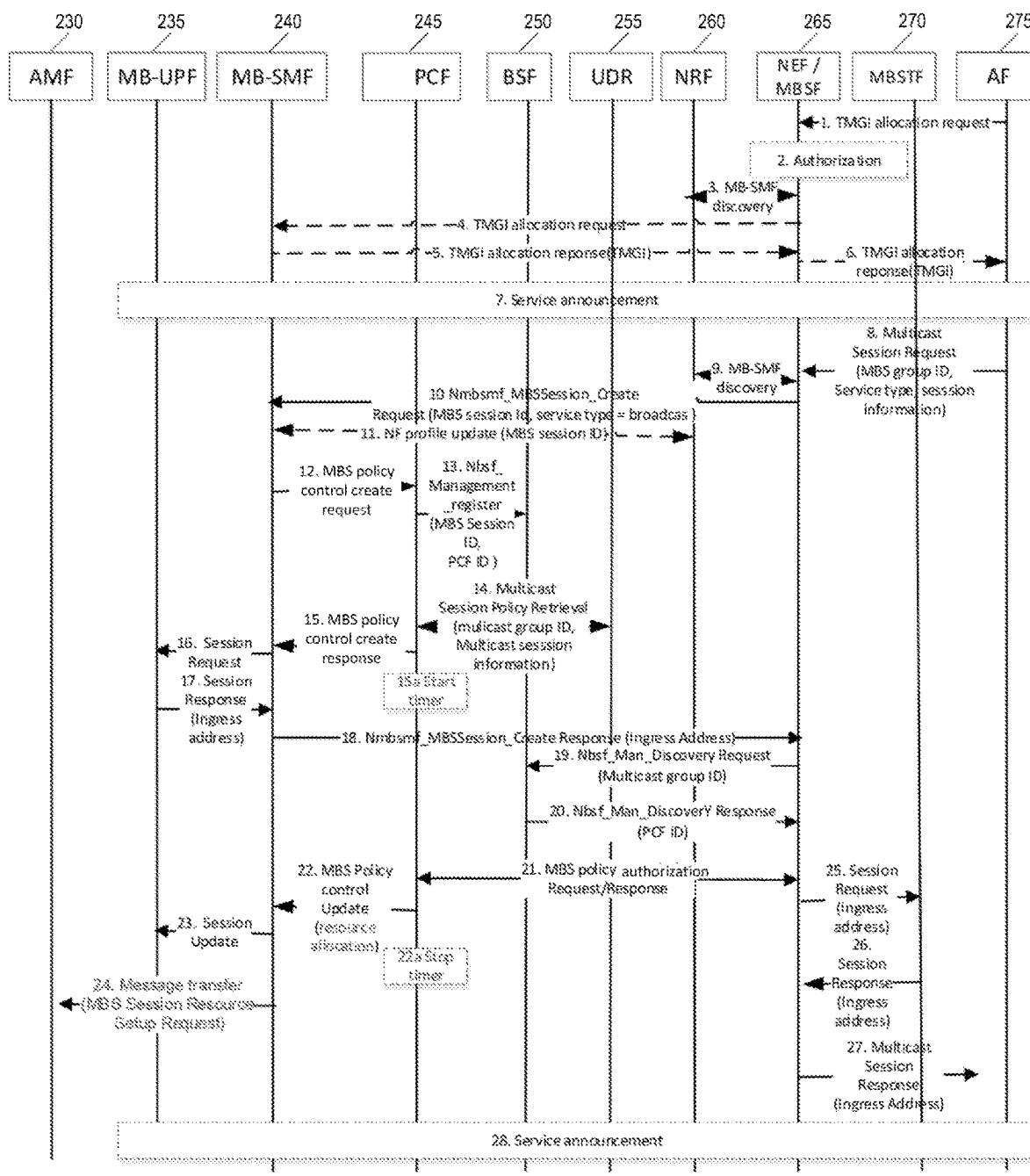
FIG. 2 illustrates an example of a signaling diagram, according to some example embodiments.

FIG. 2 illustrates an example of a signaling diagram depicting how to perform initial MBS session configuration with PCC, according to certain example embodiments. AMF 230, MB-UPF 235, MB-SMF 240, PCF 245, BSF 250, UDR 255, NRF 260, NEF/MBSF 265, MBSTF 270, and AF 275 may be similar to NE 910, as illustrated in FIG. 9, according to certain example embodiments.

AF 275 may use the configuration steps for an MBS session to start an MBS session towards 5GC, which may consist of TMGI allocation and MBS session start procedures that apply to both multicast and broadcast communications. MBS session establishment/activation procedures may follow MBS session configuration procedures per their service type (multicast or broadcast service) to reserve resources towards NG-RAN. For broadcast communication, MBS session establishment/start may include radio resource reservation towards a NG-RAN. For multicast communication, the radio resource reservation may be performed when a UE is available to join. For both broadcast and multicast communication, the TMGI allocation may be separated from the MBS session establishment/start procedure. For multicast communication, TMGI allocation procedures may be applicable if TMGI is used as MBS Session ID.

Steps 1-9 in FIG. 2 may be similar to steps 1-9 described above with respect to FIG. 1. At 10, NEF/MBSF 265 may send an MBS Session Create Request (MBS Session ID, service type, TMGI allocation indication, MBS service area information, ingress transport address request indication) to MB-SMF 240 to request MB-SMF 240 to reserve ingress resources for an MBS distribution session, and may provide MBS Session ID or request allocation, and indicate its service type (either multicast service or broadcast service). The MBS Session Create Request may also indicate if the allocation of an ingress transport address is requested. The MBS service area information may be provided by NEF/MBSF 265 to MB-SMF 240 if provided by AF 275 at step 7.

Steps 11-14 may also be similar to steps 11-14 described in FIG. 1. At 15, when receiving a request for the establishment of policy control session for a broadcast session at 12, PCF 245 may provide policies with an indication requesting no resource allocation in the reply, and/or may start a timer for the broadcast session to wait for the establishment of a policy authorization. Based on the indication about no resource allocation in the policies, MB-SMF 240 may not signal to AMF 230 to request the allocation of resources to for the transmission of the broadcast session.

Steps 16-21 may also be similar to steps 16-21 as described above with respect to FIG. 1. At 22, upon expiration of the timer and/or upon receiving a request for a policy authorization for that broadcast session from NEF/MBSF 265 at 21, PCF 245 may provide policies within the policy control session with an indication requesting the resource allocation. At 22a, upon receiving a request for a policy authorization for that broadcast session from NEF/MBSF 265, PCF 245 may stop the timer. At 23, if required by the updated policies, MB-SMF 240 may update MB-UPF 235, accordingly. At 24, based on the indication about the resource allocation in the policies, MB-SMF 240 may signal AMF 230 to request the allocation of resources to for the transmission of the broadcast session. Steps 25-28 may then be similar to steps 24-27 discussed in FIG. 1.

Figure 3:
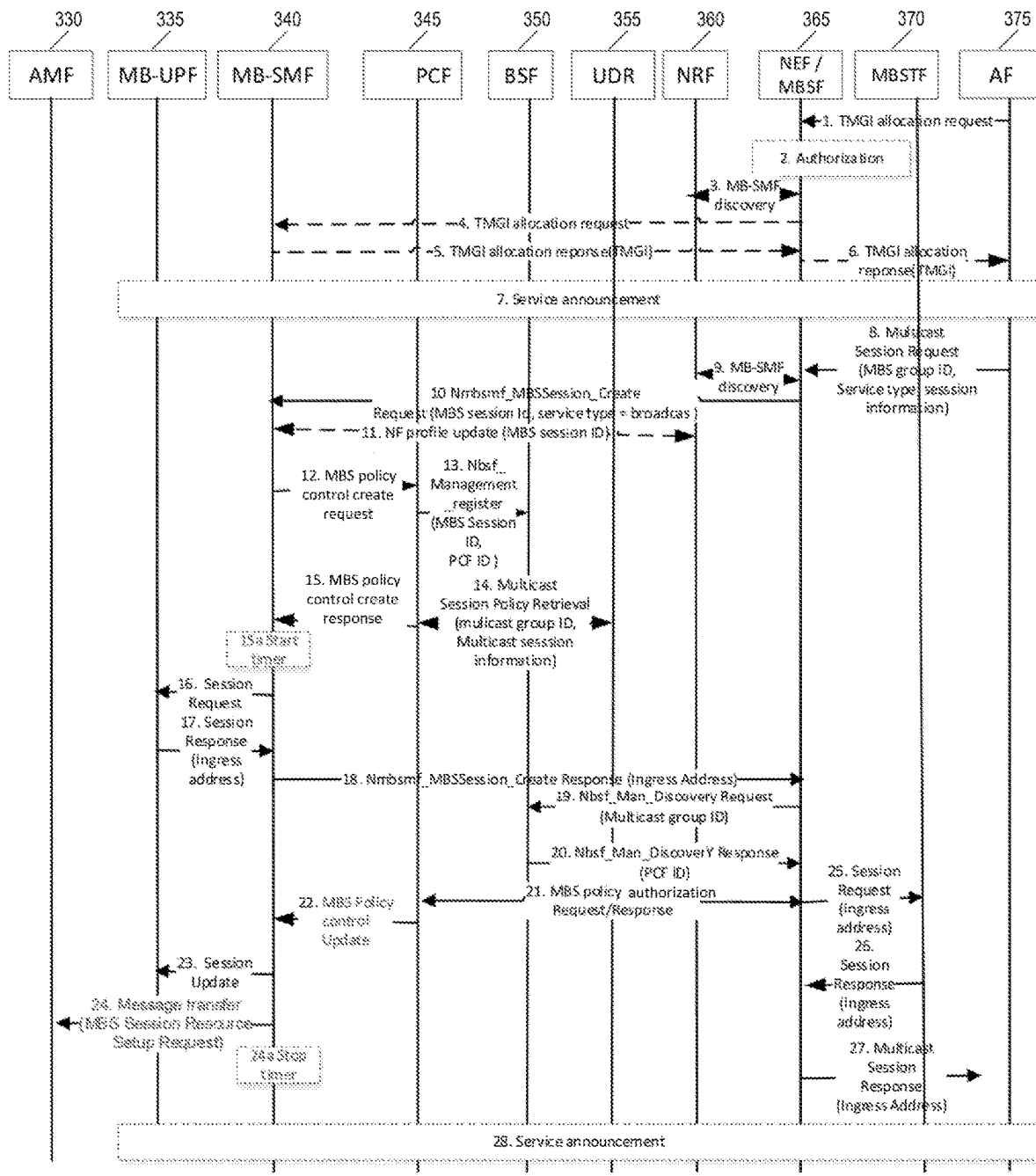
FIG. 3 illustrates another example of a signaling diagram, according to various example embodiments.

FIG. 3 illustrates an example of a signaling diagram depicting how to perform initial MBS session configuration with PCC, according to certain example embodiments. AMF 330, MB-UPF 335, MB-SMF 340, PCF 345, BSF 350, UDR 355, NRF 360, NEF/MBSF 365, MBSTF 370, and AF 375 may be similar to NE 910, as illustrated in FIG. 9, according to certain example embodiments.

AF 375 may use the configuration steps for an MBS session to start an MBS session towards 5GC, which may consist of TMGI allocation and MBS session start procedures that apply to both multicast and broadcast communications. MBS session establishment/activation procedures may follow MBS session configuration procedures per their service type (multicast or broadcast service) to reserve resources towards NG-RAN. For broadcast communication, MBS session establishment/start may include radio resource reservation towards a NG-RAN. For multicast communication, the radio resource reservation may be performed when a UE is available to join. For both broadcast and multicast communication, the TMGI allocation may be separated from the MBS session establishment/start procedure. For multicast communication, TMGI allocation procedures may be applicable if TMGI is used as MBS Session ID.

Steps 1-9 in FIG. 3 may be similar to steps 1-9 described above with respect to FIG. 1. At 10, NEF/MBSF 365 may send an MBS Session Create Request (MBS Session ID, service type, TMGI allocation indication, MBS service area information, ingress transport address request indication) to MB-SMF 340 to request MB-SMF 340 to reserve ingress resources for an MBS distribution session, and may provide MBS Session ID or request allocation, and indicate its service type (either multicast service or broadcast service). The MBS Session Create Request may also indicate if the allocation of an ingress transport address is requested. The MBS service area information may be provided by NEF/MBSF 365 to MB-SMF 340 if provided by AF 375 at step 7.

Steps 11-14 in FIG. 3 may be similar to steps 11-14 described above with respect to FIG. 1. At 15, PCF 145 may respond with an SM MBS Policy control Response (MBS Policy) with policies for the MBS Session ID. At 15a, after receiving a request to create a broadcast session at 10, and requesting (at 12) and obtaining (at 15) policies for the broadcast session from PCF 345, MB-SMF 340 may start a timer for the broadcast session to wait for an update of those policies from PCF 345 (at 22, below).

Steps 16-21 in FIG. 3 may be similar to steps 16-21 described above with respect to FIG. 1. At 22, if PCF 345 determines updated policies for the MBS session in step 21, PCF 345 may update the policy information at MB-SMF 340. At 23, if required by the updated policies, MB-SMF 340 may update MB-UPF 335, accordingly. At 24, upon expiration of the timer and/or upon receiving a policy update for that broadcast session from PCF 345, MB-SMF 340 may signal to AMF 330 to request the allocation of resources for the transmission of the broadcast session. At 24a, upon receiving a policy update for that broadcast session from NEF/MBSF 365, PCF 345 may also stop the timer. Steps 25-28 in FIG. 3 may also be similar to steps 25-28 described above with respect to FIG. 1.

Figure 4:
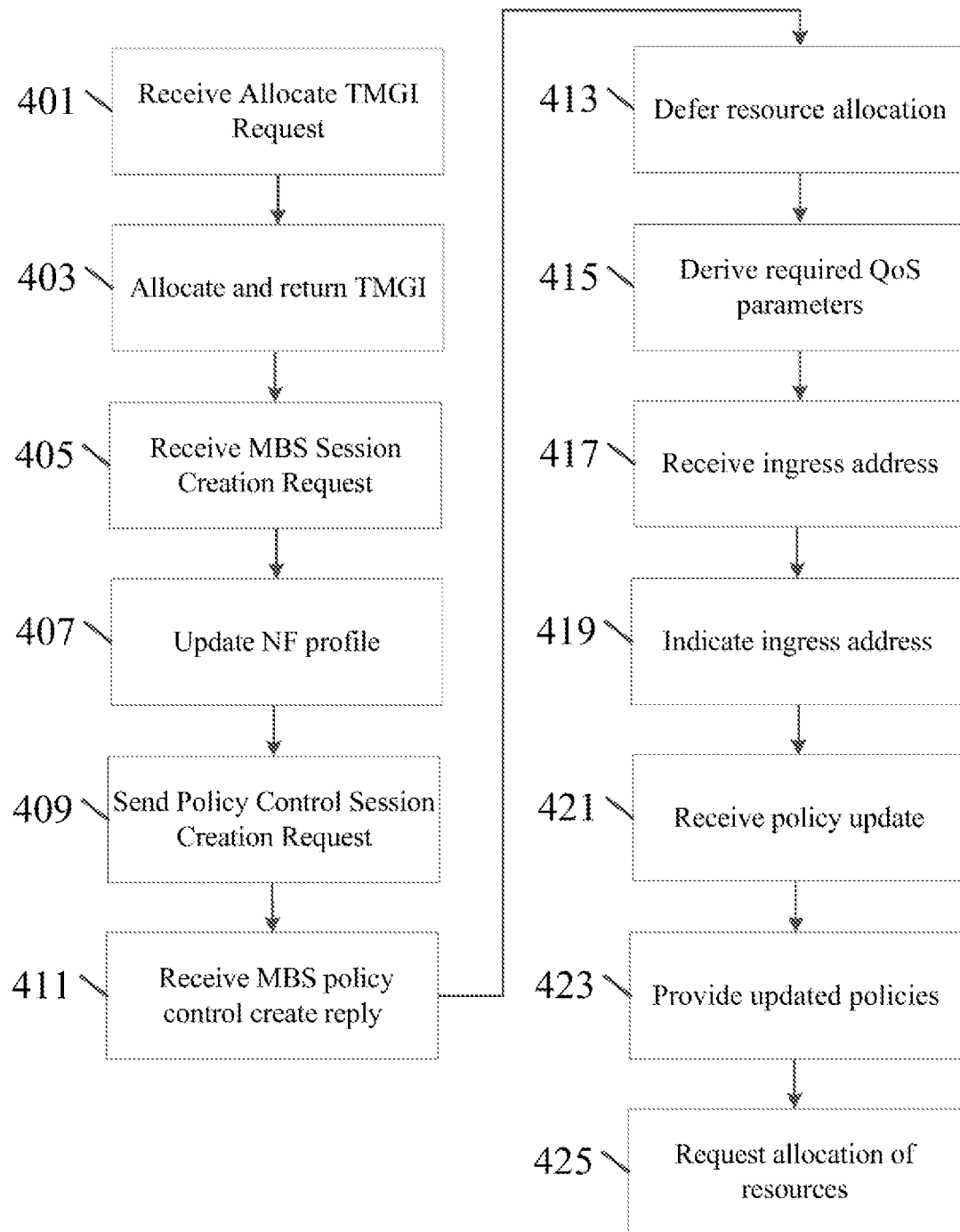
FIG. 4 illustrates an example of a flow diagram of a method, according to certain example embodiments.

FIG. 4 illustrates an example of a flow diagram of a method that may be performed by a MB-SMF, such as NE 910 illustrated in FIG. 9, according to various example embodiments.

At 401, the MB-SMF may receive an Allocate TMGI Request Q message from a NEF/MBSF, which may be similar to NE 910 illustrated in FIG. 9, according to various example embodiments. At 403, the MB-SMF may allocate TMGI(s) and return the TMGI(s) to the NEF/MBSF via Allocate TMGI Response (TMGI(s)).

At 405, the MB-SMF may receive, from the NEF/MBSF, at least one multicast/broadcast session creation request comprising at least one indication of policy authorization for the multicast/broadcast session. In some example embodiments, an MBS Session Create Request (MBS Session ID, service type, TMGI allocation indication, MBS service area information, ingress transport address request indication) requesting the MB-SMF to reserve ingress resources for an MBS distribution session, and may provide MBS Session ID or request allocation, and indicate its service type (either multicast service or broadcast service). In the request to create a broadcast session, the request may indicate whether it will also provide a policy authorization for the broadcast session with a PCF, which may also be similar to NE 910 illustrated in FIG. 9. The MBS Session Create Request may also indicate if the allocation of an ingress transport address is requested.

At 407, if the MB-SMF is selected by the NEF/MBSF, and source specific multicast address is received, the MB-SMF may allocate TMGI, and the MB-SMF may update at least one NF profile to a NRF (such as NE 910 illustrated in FIG. 9) with the serving MBS Session ID. In certain example embodiments, if TMGI is used to represent an MBS Session, the MB-SMF may not need to update the NRF if the TMGI range(s) supported by the MB-SMF are already included in the MB-SMF profile when the MB-SMF registers itself into the NRF. In response to the at least one indication of policy authorization for the broadcast session, at 409, the MB-SMF may request, from a PCF (such as NE 910 in FIG. 9), the creation of a policy control session for the multicast/broadcast session from at least one policy control function.

At 411, the PCF may respond with an SM MBS Policy control Response (MBS Policy) with policies for the MBS Session ID.

At 413, in response to the at least one indication of policy authorization for the multicast/broadcast session and the determination that the multicast/broadcast session is a broadcast session, the MB-SMF may defer at least one resource allocation request associated with the at least one broadcast session to at least one access and mobility management function until the reception of an update request in the policy control session.

At 415, if PCC is not used, the MB-SMF may derive the required QoS parameters locally. The MB-SMF may select a MB-UPF and/or request it to reserve user plane ingress resources. If multicast transport of the MBS data towards RAN nodes is to be used, the MB-SMF may also request an MB-UPF to reserve for the outgoing data a tunnel endpoint and the related identifiers (source IP address, source specific multicast address and GTP Tunnel ID) and to forward data received at the user plane ingress resource using that tunnel endpoint. If ingress address is not requested, the MB-SMF may configure the MB-UPF to handle the multicast data distribution, and request the MB-UPF to join the multicast tree towards the content provider. The MB-UPF may also join the distribution tree of the content provider in the subsequent session establishment procedure.

At 417, if requested, the MB-UPF may select an ingress address (IP address and port) and a tunnel endpoint for the outgoing data, and the MB-SMF may receive the ingress address. For broadcast communication, the MB-SMF may continue the procedure towards the AMF 130 (and/or an NG-RAN).

At 419, the MB-SMF may indicate the possibly allocated ingress address to the NEF/MBSF. The MB-SMF may include TMGI if it is allocated. It also indicates the success or failure of reserving transmission resources.

At 421, the MB-SMF may receive at least one policy update request in the policy control session from the at least one policy control function.

At 423, if required by the updated policies, the MB-SMF may update the MB-UPF, accordingly. At 425, when obtaining an MBS policy control update from the PCF at 421, the MB-SMF may signal to the AMF to request the allocation of resources for the transmission of the broadcast session.

Figure 5:
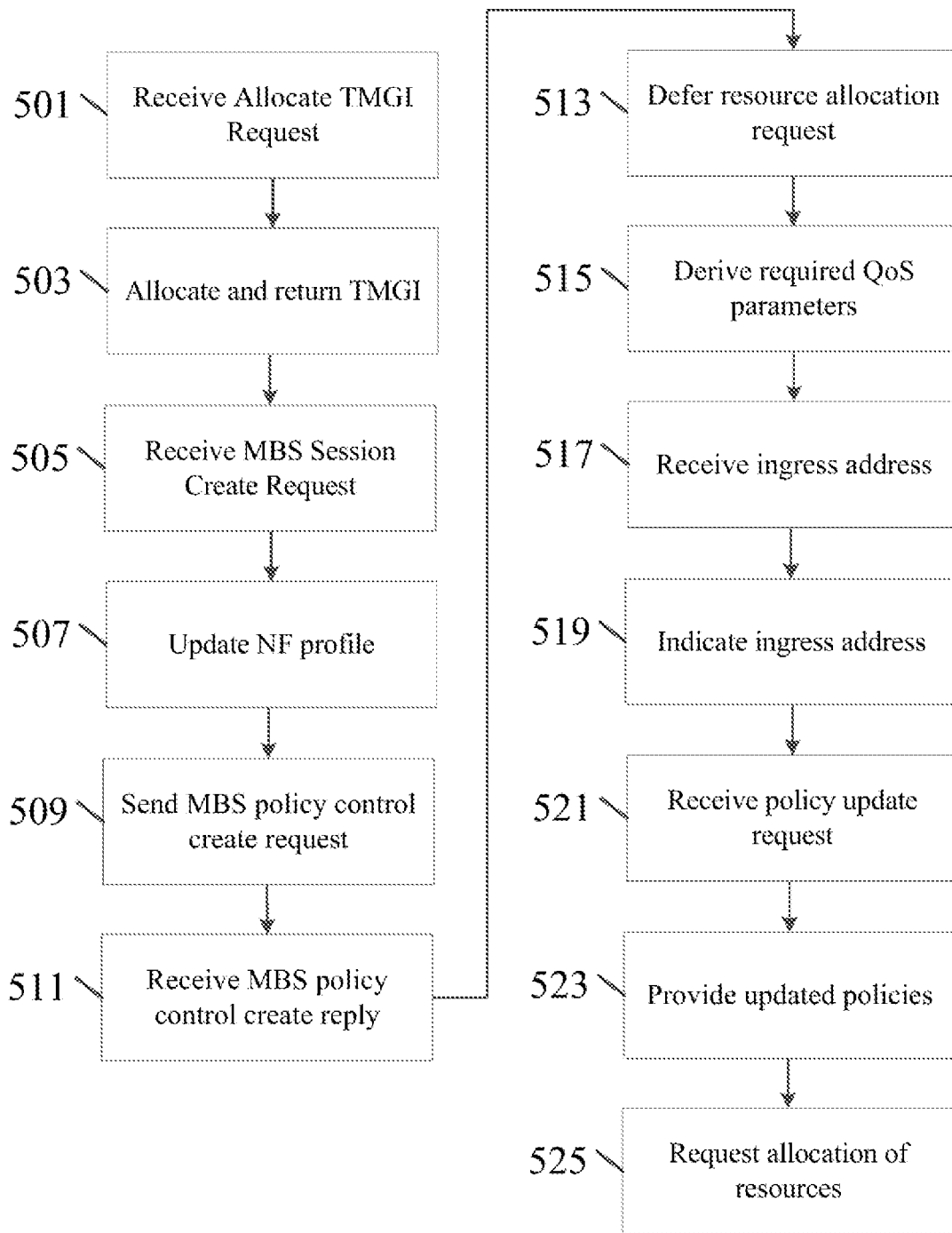
FIG. 5 illustrates another example of a flow diagram of a method, according to some example embodiments.

FIG. 5 illustrates an example of a flow diagram of a method that may be performed by a MB-SMF, such as NE 910 illustrated in FIG. 9, according to various example embodiments.

At 501, the MB-SMF may receive an Allocate TMGI Request Q message from a NEF/MBSF, which may be similar to NE 910 illustrated in FIG. 9, according to various example embodiments. At 503, the MB-SMF may allocate TMGI(s) and return the TMGI(s) to the NEF/MBSF via Allocate TMGI Response (TMGI(s)).

At 505, the MB-SMF may receive, from the NEF/MBSF, at least one broadcast session creation request, such as an MBS Session Create Request (MBS Session ID, service type, TMGI allocation indication, MBS service area information, ingress transport address request indication) requesting the MB-SMF to reserve ingress resources for an MBS distribution session, and may provide MBS Session ID or request allocation, and indicate its service type (either multicast service or broadcast service). The MBS Session Create Request may also indicate if the allocation of an ingress transport address is requested.

At 507, if the MB-SMF is selected by the NEF/MBSF, and source specific multicast address is received, the MB-SMF may allocate TMGI, and the MB-SMF may update at least one NF profile to a NRF (such as NE 910 illustrated in FIG. 9) with the serving MBS Session ID. In certain example embodiments, if TMGI is used to represent an MBS Session, the MB-SMF may not need to update the NRF if the TMGI range(s) supported by the MB-SMF are already included in the MB-SMF profile when the MB-SMF registers itself into the NRF. At 509, the MB-SMF may request the creation of a policy control session for the broadcast session from, such as by sending a MBS Policy control Create Request (MBS Session ID) to a PCF (such as NE 910 in FIG. 9) with the MBS Session ID.

At 511, from the at least one policy control function, the MB-SMF receives from the at least one policy control function, in response to the at least one request for creation of a policy control session, policy information comprising at least one indication requesting no resource allocation, for instance within an MBS Policy control Create reply message.

At 513, when receiving a request for the establishment of policy control for a multicast session, the MB-SMF may receive from the PCF policies with an indication requesting no resource allocation in the reply. In response to the at least one indication requesting no resource allocation, the MB-SMF may defer at least one resource allocation request associated with the at least one broadcast session to at least one Access and Mobility Management Function until the reception of an update request in the a policy control session.

At 515, if PCC is not used, the MB-SMF may derive the required QoS parameters locally. The MB-SMF may select a MB-UPF and/or request it to reserve user plane ingress resources. If multicast transport of the MBS data towards RAN nodes is to be used, the MB-SMF may also request an MB-UPF to reserve for the outgoing data a tunnel endpoint and the related identifiers (source IP address, source specific multicast address and GTP Tunnel ID) and to forward data received at the user plane ingress resource using that tunnel endpoint. If ingress address is not requested, the MB-SMF may configure the MB-UPF to handle the multicast data distribution, and request the MB-UPF to join the multicast tree towards the content provider. The MB-UPF may also join the distribution tree of the content provider in the subsequent session establishment procedure.

At 517, if requested, the MB-UPF may select an ingress address (IP address and port) and a tunnel endpoint for the outgoing data, and the MB-SMF may receive the ingress address. For broadcast communication, the MB-SMF may continue the procedure towards the AMF (and/or an NG-RAN).

At 519, the MB-SMF may indicate the possibly allocated ingress address to the NEF/MBSF. The MB-SMF may include TMGI if it is allocated. It also indicates the success or failure of reserving transmission resources.

At 521, the MB-SMF may receive at least one policy update request in the policy control session from the at least one policy control function comprising at least one indication requesting resource allocation. In certain embodiments, when obtaining a request for the creation of a policy authorization, for a broadcast session for which it already performs policy control towards the MB-SMF, the MB-SMF may receive from the PCF a policy update message even if no policies need to be changed.

At 523, if required by the updated policies, the MB-SMF may update the MB-UPF, accordingly. At 525, in response to the at least one indication requesting resource allocation, the MB-SMF may transmit at least one resource allocation request associated with at least one broadcast session to at least one Access and Mobility Management Function.

Figure 6:
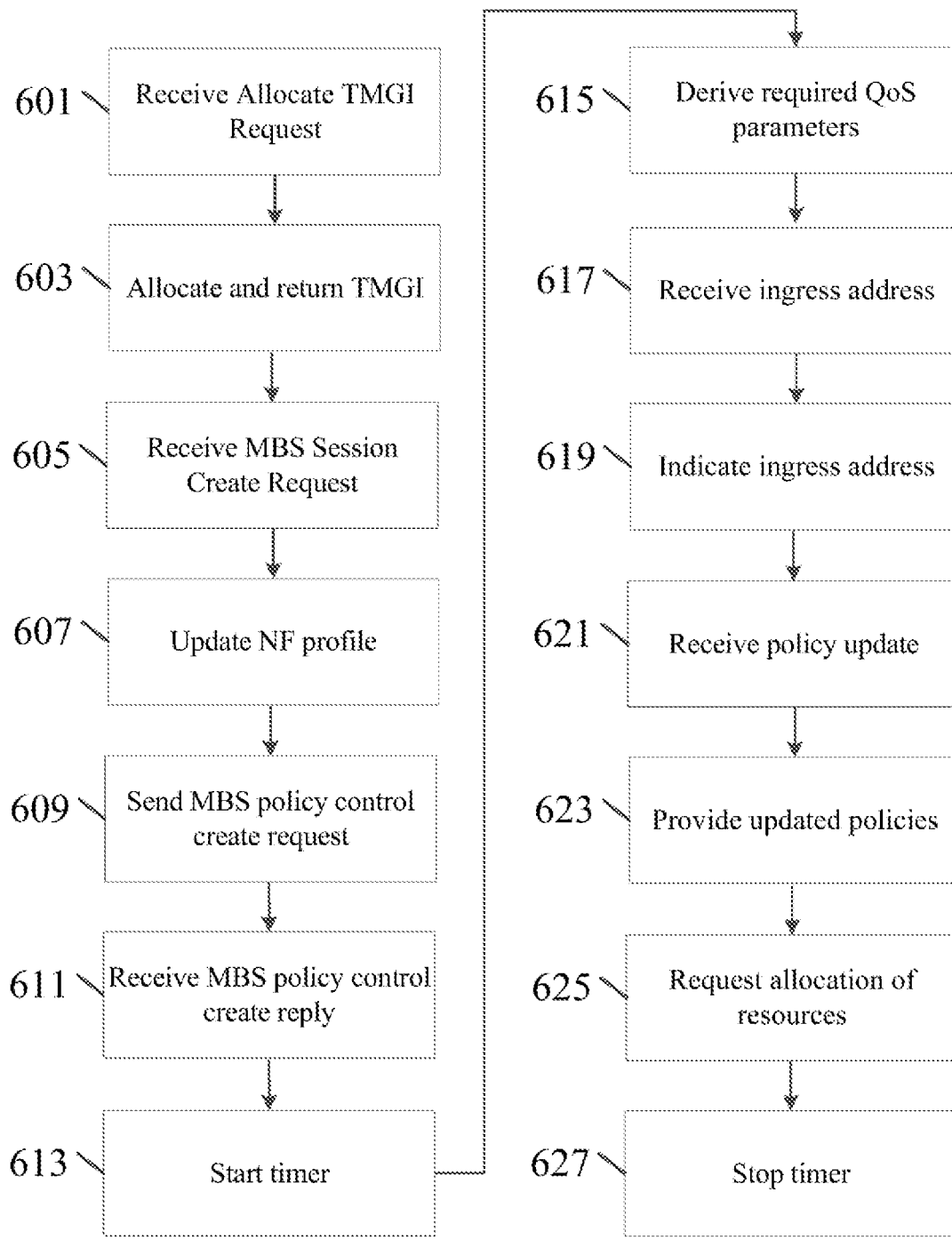
FIG. 6 illustrates another example of a flow diagram of a method, according to various example embodiments.

FIG. 6 illustrates an example of a flow diagram of a method that may be performed by a MB-SMF, such as NE 910 illustrated in FIG. 9, according to various example embodiments.

At 601, the MB-SMF may receive an Allocate TMGI Request Q message from a NEF/MBSF, which may be similar to NE 910 illustrated in FIG. 9, according to various example embodiments. At 603, the MB-SMF may allocate TMGI(s) and return the TMGI(s) to the NEF/MBSF via Allocate TMGI Response (TMGI(s)).

At 605, the MB-SMF may receive, from the NEF/MBSF, at least one broadcast session creation request, for example, an MBS Session Create Request (MBS Session ID, service type, TMGI allocation indication, MBS service area information, ingress transport address request indication) requesting the MB-SMF to reserve ingress resources for an MBS distribution session, and may provide MBS Session ID or request allocation, and indicate its service type (either multicast service or broadcast service). The MBS Session Create Request may also indicate if the allocation of an ingress transport address is requested.

At 607, if the MB-SMF is selected by the NEF/MBSF, and source specific multicast address is received, the MB-SMF may allocate TMGI, and the MB-SMF may update at least one NF profile to a NRF (such as NE 910 illustrated in FIG. 9) with the serving MBS Session ID. In certain example embodiments, if TMGI is used to represent an MBS Session, the MB-SMF may not need to update the NRF if the TMGI range(s) supported by the MB-SMF are already included in the MB-SMF profile when the MB-SMF registers itself into the NRF. At 609, the MB-SMF may request the creation of a policy control session for the broadcast session from at least one policy control function, for example, by sending a MBS Policy control create Request to a PCF (such as NE 910 in FIG. 9) with the MBS Session ID to request the creation of a policy control session for the broadcast session. At 611, the PCF may respond with an MBS Policy control create reply (MBS Policy) with policies for the MBS Session ID.

At 613, in response to the broadcast session creation request, the MB-SMF may start at least one timer associated with at least one broadcast session.

At 615, if PCC is not used, the MB-SMF may derive the required QoS parameters locally. The MB-SMF may select the MB-UPF and/or request it to reserve user plane ingress resources. If multicast transport of the MBS data towards RAN nodes is to be used, the MB-SMF may also request the MB-UPF to reserve for the outgoing data a tunnel endpoint and the related identifiers (source IP address, source specific multicast address and GTP Tunnel ID) and to forward data received at the user plane ingress resource using that tunnel endpoint. If ingress address is not requested, MB-SMF may configure the MB-UPF to handle the multicast data distribution, and request the MB-UPF to join the multicast tree towards the content provider. The MB-UPF may also join the distribution tree of the content provider in the subsequent session establishment procedure.

At 617, if requested, the MB-UPF may select an ingress address (IP address and port) and a tunnel endpoint for the outgoing data, and the MB-SMF may receive the ingress address and tunnel endpoint. For broadcast communication, the MB-SMF may continue the procedure towards the AMF (and/or an NG-RAN).

At 619, the MB-SMF may indicate the possibly allocated ingress address to the NEF/MBSF. The MB-SMF may include TMGI if it is allocated. It also indicates the success or failure of reserving transmission resources.

At 621, the MB-SMF may receive from the PCF a policy update message even if no policies need to be changed.

At 623, if required by the updated policies, the MB-SMF may update the MB-UPF, accordingly. At 625, upon one or more of the at least one timer expiring or receiving at least one policy update request in the policy control session from the at least one policy control function, the MB-SMF may transmit to at least one access and mobility management function, at least one resource allocation request associated with the at least one broadcast session. At 627, the MB-SMF may stop the timer.

Figure 7:
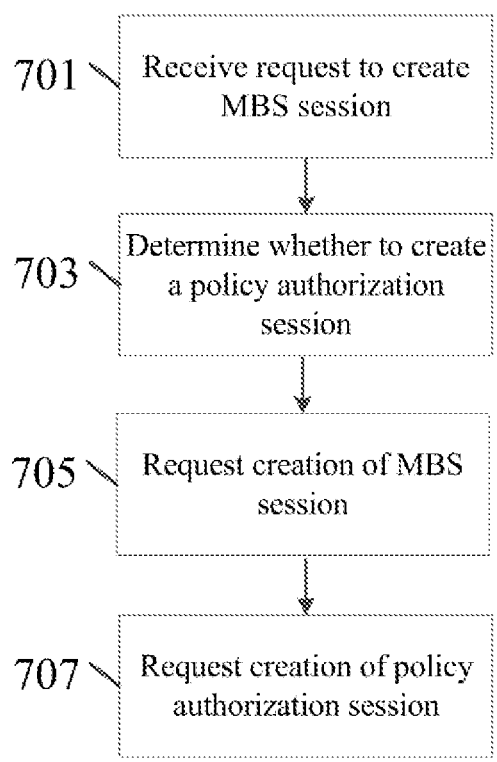
FIG. 7 illustrates another example of a flow diagram of a method, according to various example embodiments.

FIG. 7 illustrates an example of a flow diagram of a method that may be performed by a NEF-MBSF, such as NE 910 illustrated in FIG. 9, according to various example embodiments.

At 701, the NEF/MBSF may receive at least one request to create a multicast/broadcast session. At 703, the NEF/MBSF may determine whether to create a policy authorization session for the multicast/broadcast session. In some embodiments, the determining whether to create a policy authorization session for the broadcast session is based on at least one of configured information indicating whether to create a policy authorization for all multicast/broadcast sessions and at least one description of the multicast/broadcast session in the received request to create the broadcast session. Additionally or alternatively, the determining determines to create a policy authorization session for the broadcast session in response to the description of the multicast/broadcast session in the received request to create the broadcast session comprising a plurality of data flows.

At 705, the NEF/MBSF may request, from at least one multicast/broadcast session management function, a creation of the multicast/broadcast session. In response to determining to create a policy authorization session, the request for creation of the multicast/broadcast session may include at least one indication of policy authorization.

At 707, in response to the determining to create a policy authorization session, the NEF/MBSF may request the creation of a policy authorization session for the multicast/broadcast session from at least one policy control function.

Figure 8:
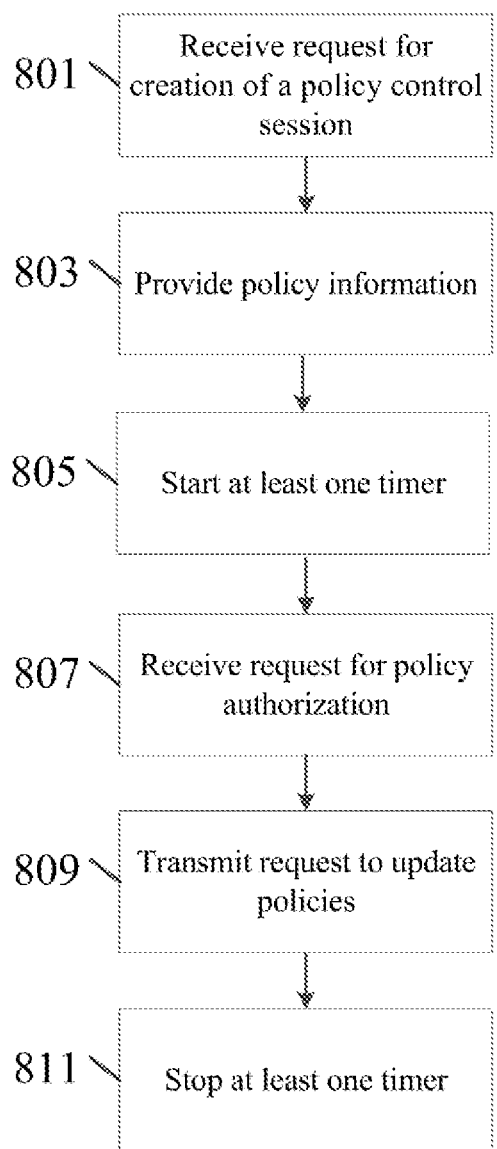
FIG. 8 illustrates another example of a flow diagram of a method, according to various example embodiments.

FIG. 8 illustrates an example of a flow diagram of a method that may be performed by a PCF, such as NE 910 illustrated in FIG. 9, according to various example embodiments. At 801, the PCF may receive, from an MB-SMF (which may be similar to NE 910 illustrated in FIG. 9), at least one request for creation of a policy control session for a broadcast session. At 803, the PCF may provide, in response to the at least one request for creation of a policy control session, policy information comprising at least one indication requesting no resource allocation. At 805, in response to the request for creation of a policy control session, the PCF may start at least one timer.

At 807, the PCF may receive at least one request for policy authorization associated to the at least one broadcast session At 809, upon one or more of the at least one timer expiring or receiving at least one request for policy authorization associated to the at least one broadcast session, the PCF may transmit towards the multicast/broadcast session management function at least one request to update the policies for the policy control session comprising at least one indication requesting resource allocation.

At 811, the PCF may, upon receiving at least one request for policy authorization associated at least one broadcast session, stop the at least one timer.

FIG. 9 illustrates an example of a system according to certain example embodiments. In one example embodiment, a system may include multiple devices, such as, for example, NE 910 and/or UE 920.

NE 910 may be one or more of a base station, such as an eNB or gNB, a serving gateway, a server, and/or any other access node or combination thereof. Furthermore, NE 910 and/or UE 920 may be one or more of a citizens broadband radio service device (CBSD).

NE 910 may further comprise at least one gNB-CU, which may be associated with at least one gNB-DU. The at least one gNB-CU and the at least one gNB-DU may be in communication via at least one F1 interface, at least one $X_n$-C interface, and/or at least one NG interface via a 5GC.

UE 920 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

NE 910 and/or UE 920 may include at least one processor, respectively indicated as 911 and 921. Processors 911 and 921 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of the devices, as indicated at 912 and 922. The memory may be fixed or removable. The memory may include computer program instructions or computer code contained therein. Memories 912 and 922 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory, and which may be processed by the processors, may be any suitable form of computer program code, for example, a compiled or interpreted computer program written in any suitable programming language.

Processors 911 and 921, memories 912 and 922, and any subset thereof, may be configured to provide means corresponding to the various blocks of FIGS. 1-8. Although not shown, the devices may also include positioning hardware, such as GPS or micro electrical mechanical system (MEMS) hardware, which may be used to determine a location of the device. Other sensors are also permitted, and may be configured to determine location, elevation, velocity, orientation, and so forth, such as barometers, compasses, and the like.

As shown in FIG. 9, transceivers 913 and 923 may be provided, and one or more devices may also include at least one antenna, respectively illustrated as 914 and 924. The device may have many antennas, such as an array of antennas configured for multiple input multiple output (MIMO) communications, or multiple antennas for multiple RATs. Other configurations of these devices, for example, may be provided. Transceivers 913 and 923 may be a transmitter, a receiver, both a transmitter and a receiver, or a unit or device that may be configured both for transmission and reception.

The memory and the computer program instructions may be configured, with the processor for the particular device, to cause a hardware apparatus, such as UE, to perform any of the processes described above (i.e., FIGS. 1-8). Therefore, in certain example embodiments, a non-transitory computer-readable medium may be encoded with computer instructions that, when executed in hardware, perform a process such as one of the processes described herein. Alternatively, certain example embodiments may be performed entirely in hardware.

In certain example embodiments, an apparatus may include circuitry configured to perform any of the processes or functions illustrated in FIGS. 1-8. For example, circuitry may be hardware-only circuit implementations, such as analog and/or digital circuitry. In another example, circuitry may be a combination of hardware circuits and software, such as a combination of analog and/or digital hardware circuitry with software or firmware, and/or any portions of hardware processors with software (including digital signal processors), software, and at least one memory that work together to cause an apparatus to perform various processes or functions. In yet another example, circuitry may be hardware circuitry and or processors, such as a microprocessor or a portion of a microprocessor, that includes software, such as firmware, for operation. Software in circuitry may not be present when it is not needed for the operation of the hardware.

Figure 10:
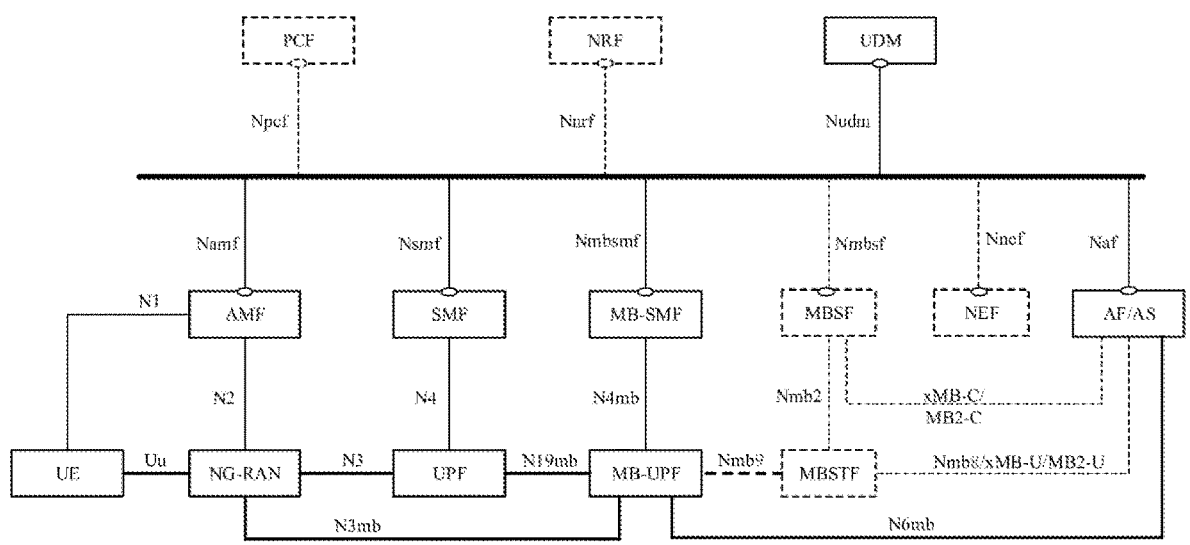
FIG. 10 illustrates an example of a fifth generation (5G) network and system architecture, according to certain example embodiments.

FIG. 10 illustrates an example of a 5G network and system architecture according to certain example embodiments. Shown are multiple network functions that may be implemented as software operating as part of a network device or dedicated hardware, as a network device itself or dedicated hardware, or as a virtual function operating as a network device or dedicated hardware. The NE and UE illustrated in FIG. 9 may be similar to NE 910 and UE 920, respectively. The user plane function (UPF) may provide services such as intra-RAT and inter-RAT mobility, routing and forwarding of data packets, inspection of packets, user plane quality of service (QoS) processing, buffering of downlink packets, and/or triggering of downlink data notifications. The application function (AF) may primarily interface with the core network to facilitate application usage of traffic routing and interact with the policy framework.

Some example embodiments described herein may be described as follows:

Initial MBS Session Configuration with PCC

The configuration steps for MBS Session are used by the AF to start the MBS Session towards 5GC and consist of TMGI allocation and MBS session start procedures, and they apply to both multicast and broadcast communications unless otherwise stated. MBS session establishment/activation procedure may follow the MBS session configuration procedure per its service type (multicast or broadcast service) to reserve resources towards NG-RAN.

For broadcast communication, MBS Session establishment/start consists of radio resource reservation towards the NG-RAN. For multicast communication, the radio resource reservation is performed when there is UE join.

For both broadcast and multicast communication, the TMGI allocation may be separated from the MBS Session Establishment/Start procedure.

For multicast communication, TMGI allocation procedure may be applicable if TMGI is used as MBS Session ID.

Steps 1 to 5 may be optional and applicable if TMGI is used as MBS Session ID and required to be pre-allocated.

1. AF sends Allocate TMGI Request ( ) message to NEF/MBSF to request allocation of a TMGI to identify a new MBS session.

Depending on the configuration, MB-SMF may receive requests from AF directly, or via NEF, or via MBSF, or via NEF and MBSF.

2. NEF/MBSF may check authorization of AF.

3. NEF/MBSF may discover and select an MB-SMF using NRF or based on local configuration.

4. NEF/MBSF may send an Allocate TMGI Request ( ) message to the MB-SMF.

5. MB-SMF may allocate TMGI(s) and returns the TMGI (s) to the NEF/MBSF via Allocate TMGI Response (TMGI (s)).

6. The NEF or MBSF may respond to the AF by sending an Allocate TMGI Response (TMGI(s)) message.

7. The AF may perform a Service Announcement towards UEs.

The AF informs UEs about MBS Session information with MBS Session ID, e.g., TMGI, source specific multicast address, and possibly other information e.g. MBS service area, session description information, etc.

The MBS service area information can be Cell ID list, TAI list, geographical area information or civic address information. Amongst them, Cell ID list and TAI list shall only be used by AFs who reside in trust domain, and when the AFs are aware of such information.

The UE needs to be aware if the service is broadcast or multicast to decide if JOIN is to be performed.

8. AF of content provider may provide description for an MBS session (possibly providing information for a previously allocated TMGI; e.g. service type of either multicast service or broadcast service) to NEF/MBSF by MBS Session Request ([MBS Session ID], service type, MBS information,) message. If step 1-4 has not been executed before, the AF may provide a source specific multicast address or it may request that the network allocates an identifier for the MBS session (i.e., TMGI) and its service type of either multicast service or broadcast service. MBS information may further include QoS requirements, MBS service area information (see step 6 for detail) identifying the service scope, start and end time of MBS. In addition, MBS information may also indicate whether the allocation of an ingress transport address is requested.

If geographical area information or civic address information was provided by the AF as MBS service area, NEF/MBSF may translate the MBS service area to Cell ID list or TAI list.

NEF/MBSF checks authorization of content provider.

9. NEF/MBSF may discover MB-SMF candidates and selects MB-SMF as ingress control node, possibly based on location area.

If TMGI is included in step 8, NEF/MBSF may find MB-SMF based on TMGI.

10. NEF/MBSF may send MBS Session Create Request (MBS Session ID, service type, TMGI allocation indication, MBS service area information, ingress transport address request indication) to MB-SMF, to request MB-SMF to reserve ingress resources for a MBS distribution session and provides MBS Session ID or request allocation, and indicate its service type (either multicast service or broadcast service). It may also indicate if the allocation of an ingress transport address is requested. The NEF/MBSF indicates to the MB-SMF that it will also provide a policy authorization for the broadcast session with the PCF The MBS service area information may be provided by NEF/MBSF to the MB-SMF if provided by the AF in step 7.

11. If MB-SMF is selected by NEF/MBSF in step 9 and source specific multicast address is provided in step 10, MB-SMF may allocate TMGI and MB-SMF may update NF profile to NRF with the serving MBS Session ID.

NOTE 2: If TMGI is used to represent an MBS Session, MB-SMF may not need to update NRF if the TMGI range(s) supported by an MB-SMF is already included in the MB-SMF profile when MB-SMF register itself into NRF.

12. [Optional] The MB-SMF sends SM MBS Policy authorization Request (MBS Session ID) to PCF with the MBS Session ID.

13. [Optional] The PCF may register at the BSF that it handles the multicast session. Additionally, it may provide an identifier that the policy authorization is for multicast and the MBS Session ID, it own PCF ID and optionally its PCF set ID.

14. [Optional] The PCF may retrieve preconfigured policy information for the MBS session from the UDR.

15. [Optional] The PCF may respond with SM MBS Policy authorization Response (MBS Policy,) with policies for the MBS Session ID. Based on the indication in step 10, the MB-SMF does not signal to AMFs to request the allocation of resources to for the transmission of the broadcast session after this step 16. If PCC is not used, The MB-SMF may derive the required QoS parameters locally. MB-SMF selects the MB-UPF and requests it to reserve user plane ingress resources. If multicast transport of the MBS data towards RAN nodes may be used, the MB-SMF also request the MB-UPF to reserve for the outgoing data a tunnel endpoint and the related identifiers (source IP address, source specific multicast address and GTP Tunnel ID) and to forward data received at the user plane ingress resource using that tunnel endpoint.

If ingress address is not requested, the MB-SMF may configure MB-UPF to handle the multicast data distribution and request the MB-UPF to join the multicast tree towards the content provider. MB-UPF can also join the distribution tree of the content provider in the subsequent session establishment procedure.

17. If requested, MB-UPF may select an ingress address (IP address and port) and a tunnel endpoint for the outgoing data and provides it to MB-SMF 18. MB-SMF may indicate the possibly allocated ingress address to the NEF/MBSF. MB-SMF may include TMGI if it is allocated in step 9. It also indicates the success or failure of reserving transmission resources.

19-20. [Optional] The NEF/MBSF may use the BSF Discovery service to discover the PCF serving the MBS session with the MBS session ID.

21. [Optional] The NEF/MBSF may send SM MBS Policy authorization Request to PCF with the MBS session ID and MBS information, The PCF may determine whether the request is authorized.

If the request is authorized, the PCF derives the required QoS parameters based on the information provided by the NEF and determines whether this QoS is allowed (according to the PCF configuration for this Application).

If the request is not authorized or the required QoS is not allowed, the PCF may indicate so in the response to the NEF 22. [Conditional] When obtaining a request for the creation of a policy authorization (signal 21) for a broadcast session, for which it already performs policy control towards an MB-SMF, the PCF may provide a policy update to the MB-SMF; if no real policy update is required, the PCF may repeat previous policies or sends an empty update message.

23. [Conditional] If required by the updated policies, the MB-SMF may update the MB-UPF accordingly.

24. When obtaining an MBS policy control update from the PCF (signal 22) for a broadcast session, the MB-SMF may continue the procedure towards the AMF and NG-RAN as specified in clause 7.3.1 to request the allocation of resources to for the transmission of the broadcast session.

25. [Optional] If the MBSF decides to use an MBSTF, the MBSF may provide the received ingress address in step 18 towards the MBSTF as DL destination, and requests the MBSTF to allocate the user plane ingress resources.

26. [Conditional on step 25] If requested, MBSTF may select an ingress address (IP address and port) and provides it to NEF/MBSF.

27. The NEF/MBSF-C may include the ingress address if allocated and other parameters (e.g. TMGI) to the AF by MBS Session Response ([TMGI], [Allocated ingress address]) message. If MBS Session ID is not provided in step 8, or the MBS Session ID is source specific multicast address, the NEF/MBSF may provide the allocated TMGI. If AF requests the allocation of an ingress transport address, the message may also includes the allocated ingress address.

28. Same as step 6. The AF may also perform a service announcement at this stage.

For multicast communication, depending on configuration, UE join request can be accepted from this point onward.

The features, structures, or characteristics of example embodiments described throughout this specification may be combined in any suitable manner in one or more example embodiments. For example, the usage of the phrases "various embodiments," "certain embodiments," "some embodiments," or other similar language throughout this specification refers to the fact that a particular feature, structure, or characteristic described in connection with an example embodiment may be included in at least one example embodiment. Thus, appearances of the phrases "in various embodiments," "in certain embodiments," "in some embodiments," or other similar language throughout this specification does not necessarily all refer to the same group of example embodiments, and the described features, structures, or characteristics may be combined in any suitable manner in one or more example embodiments.

Additionally, if desired, the different functions or procedures discussed above may be performed in a different order and/or concurrently with each other. Furthermore, if desired, one or more of the described functions or procedures may be optional or may be combined. As such, the description above should be considered as illustrative of the principles and teachings of certain example embodiments, and not in limitation thereof.

One having ordinary skill in the art will readily understand that the example embodiments discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of the example embodiments.

Further examples are briefly described in the following paragraphs:

Example 1: A method, comprising: receiving, by a multicast/broadcast session management function, at least one multicast/broadcast session creation request comprising at least one indication of policy authorization for the broadcast session; and requesting, by the multicast/broadcast session management function, in response to the at least one indication of policy authorization for the broadcast session, the creation of a policy control session for the multicast/broadcast session from at least one policy control function.

Example 2: The method of Example 1, further comprising: deferring, by the multicast/broadcast session management function, in response to the at least one indication of policy authorization for the multicast/broadcast session and the determination that the multicast/broadcast session comprises a broadcast session, at least one resource allocation request associated with the at least one broadcast session to at least one access and mobility management function until the reception of an update request in the policy control session; receiving, by the multicast/broadcast session management function, at least one policy update request in the policy control session from the at least one policy control function; and transmitting, by the multicast/broadcast session management function, in response to the at least one indication of policy authorization for the multicast/broadcast session and the determination that the multicast/broadcast session comprises a broadcast session and the at least one policy update request, at least one resource allocation request associated with at least one broadcast session to the at least one access and mobility management function.

Example 3: A method, comprising: receiving, by a network exposure function or a multicast/broadcast service function, at least one request to create a multicast/broadcast session; determining, by the network exposure function or the multicast/broadcast service function, whether to create a policy authorization session for the multicast/broadcast session; requesting, by the network exposure function or the multicast/broadcast service function, from at least one multicast/broadcast session management function, a creation of the multicast/broadcast session, wherein, in response to determining to create a policy authorization session, the request for creation of the multicast/broadcast session comprises at least one indication of policy authorization; and requesting, by the network exposure function or the multicast/broadcast service function, in response to the determining to create a policy authorization session, the creation of a policy authorization session for the multicast/broadcast session from at least one policy control function.

Example 4: The method of Example 3, wherein the determining, whether to create a policy authorization session for the broadcast session is based on at least one of: configured information indicating whether to create a policy authorization for all multicast/broadcast sessions; or at least one description of the multicast/broadcast session in the received request to create the broadcast session.

Example 5: The method of Example 3, wherein the determining determines to create a policy authorization session for the broadcast session in response to the description of the multicast/broadcast session in the received request to create the broadcast session comprising a plurality of data flows.

Example 6: A method, comprising: receiving, by a policy control function, from a multicast/broadcast session management function at least one request for creation of a policy control session for a broadcast session; providing, by the policy control function, in response to the at least one request for creation of a policy control session, policy information comprising at least one indication requesting no resource allocation; starting, by the policy control function, in response to the request for creation of a policy control session, at least one timer; and upon one or more of the at least one timer expiring or receiving at least one request for policy authorization associated to the at least one broadcast session, transmitting, by the policy control function, towards the multicast/broadcast session management function at least one request to update the policies for the policy control session comprising at least one indication requesting resource allocation.

Example 7: The method of Example 6, further comprising: upon receiving at least one request for policy authorization associated at least one broadcast session, by the policy control function, stopping the at least one timer.

Example 8: A method, comprising: receiving, by a multicast/broadcast session management function, at least one broadcast session creation request; requesting, by the multicast/broadcast session management function, the creation of a policy control session for the broadcast session from at least one policy control function; receiving, by the multicast/broadcast session management function, from the at least one policy control function, in response to the at least one request for creation of a policy control session, policy information comprising at least one indication requesting no resource allocation; deferring, by the multicast/broadcast session management function, in response to the at least one indication requesting no resource allocation, at least one resource allocation request associated with the at least one broadcast session to at least one Access and Mobility Management Function until the reception of an update request in the a policy control session; receiving, by the multicast/broadcast session management function, at least one policy update request in the policy control session from the at least one policy control function comprising at least one indication requesting resource allocation; and transmitting, by the multicast/broadcast session management function, in response to the at least one indication requesting resource allocation, at least one resource allocation request associated with at least one broadcast session to at least one Access and Mobility Management Function.

Example 9: A method, comprising: receiving, by a multicast/broadcast session management function, at least one broadcast session creation request; requesting, by the multicast/broadcast session management function, the creation of a policy control session for the broadcast session from at least one policy control function; starting, by the multicast/broadcast session management function, in response to the broadcast session creation request at least one timer associated with at least one broadcast session; and upon one or more of the at least one timer expiring or receiving at least one policy update request in the policy control session from the at least one policy control function, transmitting, by the multicast/broadcast session management function, to at least one access and mobility management function, at least one resource allocation request associated with the at least one broadcast session.

Example 10: The method of Example 9, further comprising: upon receiving at least one policy update request in the policy control session, stopping, by the multicast/broadcast session management function, the at least one timer.

Example 11: An apparatus, comprising: at least one processor; and at least one memory including computer program code, wherein the at least one memory and the computer program code are configured to, with the at least one processor, cause the apparatus at least to: receive at least one multicast/broadcast session creation request comprising at least one indication of policy authorization for the broadcast session; and request, in response to the at least one indication of policy authorization for the broadcast session, the creation of a policy control session for the multicast/broadcast session from at least one policy control function.

Example 12: The apparatus of Example 11, wherein the at least one memory and the computer program code are further configured to, with the at least one processor, cause the apparatus at least to: defer, in response to the at least one indication of policy authorization for the multicast/broadcast session and the determination that the multicast/broadcast session comprises a broadcast session, at least one resource allocation request associated with the at least one broadcast session to at least one access and mobility management function until the reception of an update request in the policy control session; receive at least one policy update request in the policy control session from the at least one policy control function; and transmit, in response to the at least one indication of policy authorization for the multicast/broadcast session and the determination that the multicast/broadcast session comprises a broadcast session and the at least one policy update request, at least one resource allocation request associated with at least one broadcast session to the at least one access and mobility management function.

Example 13: An apparatus, comprising: at least one processor; and at least one memory including computer program code, wherein the at least one memory and the computer program code are configured to, with the at least one processor, cause the apparatus at least to: receive at least one request to create a multicast/broadcast session; determine whether to create a policy authorization session for the multicast/broadcast session; request from at least one multicast/broadcast session management function, a creation of the multicast/broadcast session, wherein, in response to determining to create a policy authorization session, the request for creation of the multicast/broadcast session comprises at least one indication of policy authorization; and request, in response to the determining to create a policy authorization session, the creation of a policy authorization session for the multicast/broadcast session from at least one policy control function.

Example 14: The apparatus of Example 13, wherein the determining whether to create a policy authorization session for the broadcast session is based on at least one of: configured information indicating whether to create a policy authorization for all multicast/broadcast sessions; or at least one description of the multicast/broadcast session in the received request to create the broadcast session.

Example 15: The apparatus of Example 13, wherein the determining determines to create a policy authorization session for the broadcast session in response to the description of the multicast/broadcast session in the received request to create the broadcast session comprising a plurality of data flows.

Example 16: An apparatus, comprising: at least one processor; and at least one memory including computer program code, wherein the at least one memory and the computer program code are configured to, with the at least one processor, cause the apparatus at least to: receive, from a multicast/broadcast session management function at least one request for creation of a policy control session for a broadcast session; provide, in response to the at least one request for creation of a policy control session, policy information comprising at least one indication requesting no resource allocation; start, in response to the request for creation of a policy control session, at least one timer; and upon one or more of the at least one timer expiring or receiving at least one request for policy authorization associated to the at least one broadcast session, transmit towards the multicast/broadcast session management function at least one request to update the policies for the policy control session comprising at least one indication requesting resource allocation.

Example 17: The apparatus of Example 16, wherein the at least one memory and the computer program code are further configured to, with the at least one processor, cause the apparatus at least to: upon receiving at least one request for policy authorization associated at least one broadcast session, stop the at least one timer.

Example 18: An apparatus, comprising: at least one processor; and at least one memory including computer program code, wherein the at least one memory and the computer program code are configured to, with the at least one processor, cause the apparatus at least to: receive at least one broadcast session creation request; request the creation of a policy control session for the broadcast session from at least one policy control function; receive, from the at least one policy control function, in response to the at least one request for creation of a policy control session, policy information comprising at least one indication requesting no resource allocation; defer, in response to the at least one indication requesting no resource allocation, at least one resource allocation request associated with the at least one broadcast session to at least one Access and Mobility Management Function until the reception of an update request in the a policy control session; receive at least one policy update request in the policy control session from the at least one policy control function comprising at least one indication requesting resource allocation; and transmit, in response to the at least one indication requesting resource allocation, at least one resource allocation request associated with at least one broadcast session to at least one Access and Mobility Management Function.

Example 19: An apparatus, comprising: at least one processor; and at least one memory including computer program code, wherein the at least one memory and the computer program code are configured to, with the at least one processor, cause the apparatus at least to: receive at least one broadcast session creation request; request the creation of a policy control session for the broadcast session from at least one policy control function; start, in response to the broadcast session creation request at least one timer associated with at least one broadcast session; and upon one or more of the at least one timer expiring or receiving at least one policy update request in the policy control session from the at least one policy control function, transmit, to at least one access and mobility management function, at least one resource allocation request associated with the at least one broadcast session.

Example 20: The apparatus of Example 19, wherein the at least one memory and the computer program code are further configured to, with the at least one processor, cause the apparatus at least to: upon receiving at least one policy update request in the policy control session, stop the at least one timer.

Example 21: A non-transitory computer readable medium comprising program instructions stored thereon for performing at least the following: receiving at least one multicast/broadcast session creation request comprising at least one indication of policy authorization for the broadcast session; and requesting, in response to the at least one indication of policy authorization for the broadcast session, the creation of a policy control session for the multicast/broadcast session from at least one policy control function.

Example 22: The non-transitory computer readable medium of Example 21, further performing at least the following: deferring, in response to the at least one indication of policy authorization for the multicast/broadcast session and the determination that the multicast/broadcast session comprises a broadcast session, at least one resource allocation request associated with the at least one broadcast session to at least one access and mobility management function until the reception of an update request in the policy control session; receiving at least one policy update request in the policy control session from the at least one policy control function; and transmitting, in response to the at least one indication of policy authorization for the multicast/broadcast session and the determination that the multicast/broadcast session comprises a broadcast session and the at least one policy update request, at least one resource allocation request associated with at least one broadcast session to the at least one access and mobility management function.

Example 23: A non-transitory computer readable medium comprising program instructions stored thereon for performing at least the following: receiving at least one request to create a multicast/broadcast session; determining whether to create a policy authorization session for the multicast/broadcast session; requesting, from at least one multicast/broadcast session management function, a creation of the multicast/broadcast session, wherein, in response to determining to create a policy authorization session, the request for creation of the multicast/broadcast session comprises at least one indication of policy authorization; and requesting, in response to the determining to create a policy authorization session, the creation of a policy authorization session for the multicast/broadcast session from at least one policy control function.

Example 24: The non-transitory computer readable medium of Example 23, wherein the determining, whether to create a policy authorization session for the broadcast session is based on at least one of: configured information indicating whether to create a policy authorization for all multicast/broadcast sessions; or at least one description of the multicast/broadcast session in the received request to create the broadcast session.

Example 25: The non-transitory computer readable medium of Example 23, wherein the determining determines to create a policy authorization session for the broadcast session in response to the description of the multicast/broadcast session in the received request to create the broadcast session comprising a plurality of data flows.

Example 26: A non-transitory computer-readable medium comprising program instructions stored thereon for performing a process comprising: receiving, from a multicast/broadcast session management function at least one request for creation of a policy control session for a broadcast session; providing, in response to the at least one request for creation of a policy control session, policy information comprising at least one indication requesting no resource allocation; starting, in response to the request for creation of a policy control session, at least one timer; and upon one or more of the at least one timer expiring or receiving at least one request for policy authorization associated to the at least one broadcast session, transmitting towards the multicast/broadcast session management function at least one request to update the policies for the policy control session comprising at least one indication requesting resource allocation.

Example 27: The non-transitory computer readable medium of Example 26, further performing at least the following: upon receiving at least one request for policy authorization associated at least one broadcast session, stopping the at least one timer.

Example 28: A non-transitory computer-readable medium comprising program instructions stored thereon for performing a process comprising: receiving at least one broadcast session creation request; requesting the creation of a policy control session for the broadcast session from at least one policy control function; receiving, from the at least one policy control function, in response to the at least one request for creation of a policy control session, policy information comprising at least one indication requesting no resource allocation; deferring, in response to the at least one indication requesting no resource allocation, at least one resource allocation request associated with the at least one broadcast session to at least one Access and Mobility Management Function until the reception of an update request in the a policy control session; receiving at least one policy update request in the policy control session from the at least one policy control function comprising at least one indication requesting resource allocation; and transmitting, in response to the at least one indication requesting resource allocation, at least one resource allocation request associated with at least one broadcast session to at least one Access and Mobility Management Function.

Example 29: A non-transitory computer-readable medium comprising program instructions stored thereon for performing a process comprising: receiving at least one broadcast session creation request; requesting the creation of a policy control session for the broadcast session from at least one policy control function; starting, in response to the broadcast session creation request at least one timer associated with at least one broadcast session; and upon one or more of the at least one timer expiring or receiving at least one policy update request in the policy control session from the at least one policy control function, transmitting, to at least one access and mobility management function, at least one resource allocation request associated with the at least one broadcast session.

Example 30: The non-transitory computer readable medium of Example 29, further performing at least the following: upon receiving at least one policy update request in the policy control session, stopping the at least one timer.

Example 31: An apparatus, comprising: means for performing a process according to any of Examples 1-10.

Example 32: An apparatus comprising circuitry configured to cause the apparatus to perform a process according to any of Examples 1-10.

Example 33: A computer program product encoded with instructions for performing a process according to any of Examples 1-10.

Partial Glossary

3GPP Third Generation Partnership Project
5G Fifth Generation
5GC Fifth Generation Core
5GS Fifth Generation System
5QI Fifth Generation Quality of Service Indicator
AF Application Function
AMF Access and Mobility Management Function
ASIC Application Specific Integrated Circuit
BS Base Station
BSF Binding Support Function
CBSD Citizens Broadband Radio Service Device
CE Control Elements
CN Core Network
CPU Central Processing Unit
CU Centralized Unit
DL Downlink
eMBB Enhanced Mobile Broadband
eMTC Enhanced Machine Type Communication
eNB Evolved Node B
eOLLA Enhanced Outer Loop Link Adaptation
EPS Evolved Packet System
gNB Next Generation Node B
GPS Global Positioning System
HDD Hard Disk Drive
LTE Long-Term Evolution
LTE-A Long-Term Evolution Advanced
MBS Multicast/Broadcast Service
MBSF Multicast/Broadcast Service Function
MB-SMF Multicast/Broadcast Session Management Function
MBSTF Multicast/Broadcast Service Transport Function
MB-UPF Multicast/Broadcast User Plane Function
MEMS Micro Electrical Mechanical System
MIMO Multiple Input Multiple Output
MME Mobility Management Entity
mMTC Massive Machine Type Communication
MTC Machine Type Communication
NAS Non-Access Stratum
NB-IoT Narrowband Internet of Things
NE Network Entity
NEF Network Exposure Function
NRF Network Resource Function
NG Next Generation
NG-eNB Next Generation Evolved Node B
NG-RAN Next Generation Radio Access Network
NR New Radio
NR-U New Radio Unlicensed
OLLA Outer Loop Link Adaptation
PCC Policy and Control Function
PCF Policy Control Function
PDA Personal Digital Assistance
QoS Quality of Service
RAM Random Access Memory
RAN Radio Access Network
RAT Radio Access Technology
SMF Session Management Function
TAI Tracking Area Identity
TMGI Temporary Mobile Group Identity
TR Technical Report
TS Technical Specification
UDR Unified Data Repository
UE User Equipment
UMTS Universal Mobile Telecommunications System
UPF User Plane Function
URLLC Ultra-Reliable and Low-Latency Communication
UTRAN Universal Mobile Telecommunications System Terrestrial Radio Access Network
WLAN Wireless Local Area Network

I claim:

1. A method, comprising:
receiving, by a multicast/broadcast session management function, at least one multicast/broadcast session creation request comprising at least one indication of policy authorization for a multicast/broadcast session, wherein the at least one indication of policy authorization comprises at least one indication that indicates whether a network exposure function or a multicast/broadcast service function will provide a policy authorization for the multicast/broadcast session; and requesting, by the multicast/broadcast session management function, in response to the at least one indication of policy authorization for the multicast/broadcast session, creation of a policy control session for the multicast/broadcast session from at least one policy control function.

2. The method of claim 1, further comprising:
deferring, by the multicast/broadcast session management function, in response to the at least one indication of policy authorization for the multicast/broadcast session, at least one resource allocation request associated with the multicast/broadcast session to at least one access and mobility management function until the reception of an update request in the policy control session;
receiving, by the multicast/broadcast session management function, at least one policy update request in the policy control session from the at least one policy control function; and
transmitting, by the multicast/broadcast session management function, in response to the at least one indication of policy authorization for the multicast/broadcast session and the at least one policy update request, at least one resource allocation request associated with at least one broadcast session to the at least one access and mobility management function.

3. The method of claim 2, wherein at least one resource allocation request associated with the at least one broadcast session is deferred in response to the determination that the multicast/broadcast session comprises a broadcast session; and
the at least one resource allocation request associated with at least one broadcast session to the at least one access and mobility management function is transmitted in response to the determination that the multicast/broadcast session comprises a broadcast session.

4. A method, comprising:
receiving, by a network exposure function or a multicast/broadcast service function, at least one request to create a multicast/broadcast session;
determining, by the network exposure function or the multicast/broadcast service function, whether to create a policy authorization session for the multicast/broadcast session;
requesting, by the network exposure function or the multicast/broadcast service function, from at least one multicast/broadcast session management function, a creation of the multicast/broadcast session,
wherein, in response to determining to create the policy authorization session, the request for creation of the multicast/broadcast session comprises at least one indication of policy authorization, wherein the at least one indication of policy authorization comprises at least one indication that indicates whether the network exposure function or the multicast/broadcast service function will provide a policy authorization for the multicast/broadcast session; and
requesting, by the network exposure function or the multicast/broadcast service function, creation of the policy authorization session for the multicast/broadcast session from at least one policy control function.

5. The method of claim 4, wherein the determining, whether to create the policy authorization session for the multicast/broadcast session is based on at least one of:
configured information; or
at least one description of the multicast/broadcast session in the received request to create the multicast/broadcast session.

6. The method of claim 5, wherein the configured information includes an indication whether to create a policy authorization for all multicast/broadcast sessions.

7. The method of claim 4, wherein the determining further comprises determining, by the network exposure function or the multicast/broadcast service function, to create the policy authorization session for the multicast/broadcast session in response to the description of the multicast/broadcast session in the received request to create the multicast/broadcast session, wherein the multicast/broadcast session comprises a plurality of data flows.

8. The method of claim 4, wherein the creation of the policy authorization session for the multicast/broadcast session is requested in response to the determining to create the policy authorization session.

9. An apparatus comprising:
at least one processor; and
at least one memory storing instructions that, when executed by the at least one processor, cause the apparatus at least to:
receive at least one multicast/broadcast session creation request comprising at least one indication of policy authorization for a multicast/broadcast session, wherein the at least one indication of policy authorization comprises at least one indication that indicates whether a network exposure function or a multicast/broadcast service function will provide a policy authorization for the multicast/broadcast session; and
request, in response to the at least one indication of policy authorization for the multicast/broadcast session, the creation of a policy control session for the multicast/broadcast session from at least one policy control function.

10. The apparatus of claim 9, wherein the at least one memory and the instructions, when executed by the at least one processor, further cause the apparatus at least to:
defer, in response to the at least one indication of policy authorization for the multicast/broadcast session, at least one resource allocation request associated with the multicast/broadcast session to at least one access and mobility management function until the reception of an update request in the policy control session;
receive at least one policy update request in the policy control session from the at least one policy control function; and
transmit, in response to the at least one indication of policy authorization for the multicast/broadcast session and the at least one policy update request, at least one resource allocation request associated with at least one broadcast session to the at least one access and mobility management function.

11. The apparatus of claim 10, wherein the at least one memory and the instructions, when executed by the at least one processor, further cause the apparatus at least to:
defer at least one resource allocation request associated with the at least one broadcast session in response to the determination that the multicast/broadcast session comprises a broadcast session; and
transmit the at least one resource allocation request associated with at least one broadcast session in response to the determination that the multicast/broadcast session comprises a broadcast session and the at least one policy update request.

12. The apparatus of claim 10, wherein the at least one memory and the instructions, when executed by the at least one processor, further cause the apparatus at least to:
request the creation of a policy authorization session for the multicast/broadcast session in response to the determining to create the policy authorization session.

13. An apparatus comprising:
at least one processor; and
at least one memory storing instructions that, when executed by the at least one processor, cause the apparatus at least to:
receive at least one request to create a multicast/broadcast session;
determine whether to create a policy authorization session for the multicast/broadcast session;
request from at least one multicast/broadcast session management function, a creation of the multicast/broadcast session,
wherein, in response to determining to create the policy authorization session, the request for creation of the multicast/broadcast session comprises at least one indication of policy authorization, wherein the at least one indication of policy authorization comprises at least one indication that indicates whether a network exposure function or a multicast/broadcast service function will provide a policy authorization for the multicast/broadcast session; and
request creation of the policy authorization session for the multicast/broadcast session from at least one policy control function.

14. The apparatus of claim 13, wherein the determining whether to create the policy authorization session for the multicast/broadcast session is based on at least one of:
configured information; or
at least one description of the multicast/broadcast session in the received request to create the multicast/broadcast session.

15. The apparatus of claim 14, wherein the configured information includes an indication whether to create a policy authorization for all multicast/broadcast sessions.

16. The apparatus of claim 13, wherein the apparatus is further caused to determines to create the policy authorization session for the multicast/broadcast session in response to the description of the multicast/broadcast session in the received request to create the multicast/broadcast session, wherein the multicast/broadcast session comprises a plurality of data flows.

* * * * *